United States Patent
Salamat et al.

(10) Patent No.: US 6,513,885 B1
(45) Date of Patent: Feb. 4, 2003

(54) DUAL REDUNDANT ACTIVE/ACTIVE BRAKE-BY-WIRE ARCHITECTURE

(75) Inventors: Bijan Salamat, Saugus, CA (US); Robert F. Mackness, Tujunga, CA (US)

(73) Assignee: Hydro-Aire, Inc., Burbank, CA (US)

( * ) Notice: Subject to any disclaimer, the term of this patent is extended or adjusted under 35 U.S.C. 154(b) by 0 days.

(21) Appl. No.: 09/355,057

(22) PCT Filed: May 14, 1999

(86) PCT No.: PCT/US99/10754

§ 371 (c)(1),
(2), (4) Date: Jul. 22, 1999

(87) PCT Pub. No.: WO00/69721

PCT Pub. Date: Nov. 23, 2000

(51) Int. Cl.[7] .............................. B60T 8/88; B64C 25/42
(52) U.S. Cl. .............. 303/122.09; 303/155; 303/DIG. 9
(58) Field of Search .................................. 303/155, 158, 303/178, DIG. 9, 122.09; 244/111

(56) References Cited

U.S. PATENT DOCUMENTS

| | | | | |
|---|---|---|---|---|
| 3,687,400 A | * | 8/1972 | Fitzgerald et al. | 244/102 R |
| 3,753,064 A | * | 8/1973 | Agarwal et al. | 318/227 |
| 3,926,479 A | | 12/1975 | Bissell et al. | |
| 4,043,607 A | * | 8/1977 | Signorelli et al. | 303/100 |
| 4,120,540 A | * | 10/1978 | Devlieg | 137/625.69 |
| 4,159,444 A | * | 6/1979 | Bartlett et al. | 318/564 |
| 4,402,047 A | * | 8/1983 | Newton et al. | 303/191 |
| 4,749,238 A | * | 6/1988 | Singleton et al. | 303/15 |
| 4,792,192 A | * | 12/1988 | Tveitane | 303/13 |
| 4,807,516 A | * | 2/1989 | Takats | 91/363 A |
| 4,834,465 A | * | 5/1989 | Guichard et al. | 303/15 |
| 4,884,070 A | * | 11/1989 | Hannaford | 340/825.78 |

(List continued on next page.)

FOREIGN PATENT DOCUMENTS

| | | |
|---|---|---|
| DE | 42 27 157 A1 | 4/1993 |
| EP | 0527005 A1 * | 2/1993 |
| EP | 0 614 805 A1 | 2/1994 |
| JP | 6010938 A * | 1/1985 |

Primary Examiner—Matthew C. Graham
Assistant Examiner—Melody M. Burch
(74) Attorney, Agent, or Firm—Fulwider Patton Lee & Utecht, LLP

(57) ABSTRACT

The braking control system provides dual redundant control of hydraulically operated wheel braking for an aircraft. A primary hydraulic system provides hydraulic power for normal operation of the plurality of wheel brakes, and a secondary hydraulic system provides hydraulic power for alternate operation of the plurality of wheel brakes. A control unit is provided for controlling brake pressure communicated to the wheel brakes through the primary and secondary hydraulic systems, and a monitor channel is operatively connected to the primary hydraulic system for detecting faults in the primary and secondary hydraulic systems and for selecting between the primary and secondary hydraulic systems for providing braking pressure. The monitor channel detects occurrence of loss of pressure in the primary hydraulic system, if any brake has unwanted pressure applied, and if a fault is detected on the primary or secondary channels that affects more than one wheel brake on each landing gear. The primary hydraulic system comprises at least one primary hydraulic fluid control channel and at least one secondary hydraulic fluid control channel, the primary and secondary fluid channels being redundant and partitioned among the plurality of wheel brakes so that even if both the primary and secondary channels fail to apply pressure, braking will be lost to only a portion of the wheel brakes and the loss will be in a symmetrical pattern, and the secondary hydraulic system comprises at least one primary hydraulic fluid control channel and at least one secondary hydraulic fluid control channel.

81 Claims, 14 Drawing Sheets

U.S. PATENT DOCUMENTS

| | | | | |
|---|---|---|---|---|
| 4,943,919 A | * | 7/1990 | Aslin et al. | 364/424.03 |
| 5,044,697 A | * | 9/1991 | Longyear et al. | 244/111 |
| 5,050,940 A | * | 9/1991 | Bedford et al. | 303/100 |
| 5,353,685 A | * | 10/1994 | Snow | 91/459 |
| 5,397,173 A | * | 3/1995 | Bourguet | 303/2 |
| 5,456,523 A | * | 10/1995 | Boehringer | 303/13 |
| 5,493,497 A | * | 2/1996 | Buus | 364/434 |
| 5,505,531 A | * | 4/1996 | Griffith et al. | 303/126 |
| 6,183,051 B1 | * | 2/2001 | Hill et al. | 303/122.03 |

* cited by examiner

DUAL REDUNDANT ACTIVE/ACTIVE BRAKE-BY-WIRE ARCHITECTURE

BACKGROUND OF THE INVENTION

1. Field of the Invention

This invention relates generally to aircraft landing gear braking systems, and more particularly concerns an improved system for protection against inadvertent braking, and multiply redundant separated brake control channels.

2. Description of Related Art

Automatic braking systems have been commonly provided on commercial aircraft to aid the deceleration of the aircraft upon landing. As the size and complexity of aircraft have increased, the automatic braking systems have also become more complex and computerized. Modem anti-skid systems incorporated into aircraft braking systems commonly optimize braking efficiency by adapting to runaway conditions and other factors which affect braking in order to optimize deceleration typically corresponding to the level of brake pressure selected by the pilot.

A catastrophic failure mode can occur in a conventional brake-by-wire control system that results in uncommanded brake application on one or more wheels during takeoff of the aircraft. Since uncommanded braking during takeoff can have serious consequences, and at the very least can result in unnecessary and accelerated wear to the braking system, it is desirable to configure the braking system to reduce the possibility of these undesirable results. The overriding primary consideration is, of course, safety, although considerations of reliability are also significant.

High performance digital brake-by-wire control systems have been developed and installed on several aircraft including light commercial jet transports and modern business jets that use brake pressure feedback and enhanced built-in-test capability. Brake torque control is also used to further enhance brake control. Such digital brake control systems have achieved excellent braking performance over all runway conditions, and in RTO (Refused Take Off) and landing configurations. With sophisticated brake control algorithms, optimum braking performance is assured regardless of conditions, and the same software configuration can be used with assured range of brake and hydraulic configurations.

Two specific catastrophic failure modes that need to be addresses by an aircraft braking control system architecture are: a) the inadvertent application of any brake during the takeoff roll, and b) the complete loss of braking. The problem of inadvertent application of any brake during the takeoff roll sets the following design requirements: 1) no single failure shall result in the application of any brake during take off; and 2) the probability of any combination of failures leading to any brake being applied during take off shall be extremely improbable (less than $1 \times 10^{-9}$). The second catastrophic hazard, the loss of all braking, sets the following design requirements: 1) no single failure shall lead to loss of all braking; and 2) the probability of any combination of failures leading to loss of all braking shall be extremely improbable (less than $1 \times 10^{-9}$). These high performance requirements preclude the exclusive use of software. In addition, another commonly known braking control architecture has the disadvantage that the active brake control hydraulic fluid channels are connected to a single coil within the brake control valve, which provides a single point of failure that can result in catastrophic failure in the event of failure at that point.

Redundancy is typically achieved by use of a master or monitor channel that is used to monitor the operational status of hydraulic fluid braking control channels, and the monitor channel can command a first control channel to turn off and a second control channel to commence control, for example. Another method of redundancy management uses two control channels with one active control channel, and a second, inactive control channel in standby mode. When the active channel shuts down, the standby channel takes over control. However, both the master-slave and the active-standby systems can permit a single failure within the master or the active channel to cause a major breakdown in the redundancy management system.

In addition, loss of braking can also occur as a result of the antiskid function, requiring accounting for the probability that normal, alternate, emergency, and ultimate brake systems will be depressurised by a single failure of the anti-skid system. Loss of braking can occur owing to incorrect antiskid activity as a result of control system failure or loss of aircraft power. Another significant failure is the loss of gear retraction braking, which could allow a wheel with a loose tire tread to enter the wheel well while spinning. The hardwired interlock used to prevent application of brakes during take-off, typically conflicts with the requirement to stop the wheels during climb when the thrust levers are advanced.

Furthermore, the need to preclude asymmetric braking as a result of the loss of braking, or extra braking on one main landing gear set the following design requirements: 1) combinations of failures leading to the loss of all braking on either main landing gear shall be improbable ($1 \times 10^6$); and 2) combinations of failures leading to extra braking on either main landing gear shall be improbable ($1 \times 10^{-6}$). Touchdown and aquaplaning protection is provided by comparing wheel speeds with the groundspeed signal from the Air Data Inertial Reference Units (ADIRU). Typically any main gear aft wheel that is at a velocity 50 knots or more below the ADIRU groundspeed value is given a brake release signal. Undesired asymmetrical release of brakes can result from a false ADIRU signal, or from unwanted pressure being applied to any brake.

A need therefore continues to exist for an improved aircraft landing gear braking control system. The present invention addresses these and other needs.

SUMMARY OF THE INVENTION

Briefly, and in general terms, the present invention provides for a braking control system for dual redundant control of hydraulically operated wheel brakes of aircraft landing gear providing protection against inadvertent braking, and separation of braking control through primary and secondary braking control channels using an interface with dual coil brake control valves. The braking control system is safe, reliable, maintainable, lightweight, and affordable, and provides for a redundant brake-by-wire control architecture using a primary dual redundant brake-by-wire braking system, and a secondary dual redundant analog brake-by-wire system. Positive hydraulic system selection between the normal primary and alternate secondary hydraulic braking systems is performed using solenoid operated shutoff valves (SOSV). The primary braking system control of a center landing gear, if one is present, is split between right and left pedals, with the front axle of center gear landing controlled by left pedals, and the aft axle of center landing gear controlled by right pedals, and locked wheel protection is performed on a tandem basis rather than on an axle basis to prevent fault propagation. Alternate braking is performed on a paired wheel basis through the alternate hydraulic system. The primary braking system includes pressure and antiskid control performed using dual coil servo valves with pressure feedback, autobrake control employing primary brake system servo valves, and an equal load distribution provided by pressure feedback control. Emergency braking is also provided, allowing braking when all electrical power generation and all hydraulic power generation is lost. Parking brake and ultimate braking modes are also provided, using hydraulic power stored in accumulators.

The present invention accordingly provides for a braking control system for dual redundant control of hydraulically operated wheel braking for an aircraft having landing gear that can move between a retracted position and an actuated position, the landing gear having a plurality of wheels and a corresponding plurality of wheel brakes for said plurality of wheels, and a plurality of brake pedals for controlling operation of braking of said plurality of said wheels. In a presently preferred embodiment, a primary hydraulic system is connected in fluid communication with the plurality of wheel brakes for providing hydraulic power for normal operation of the plurality of wheel brakes in a normal braking mode, and a secondary hydraulic system is connected in fluid communication with the plurality of wheel brakes for providing hydraulic power for alternate operation of the plurality of wheel brakes in an alternate braking mode. A control unit is provided for controlling brake pressure communicated to the wheel brakes through the primary and secondary hydraulic systems, and a monitor channel is operatively connected to the primary hydraulic system for detecting faults in the primary and secondary hydraulic systems and for selecting between the primary and secondary hydraulic systems for providing braking pressure. In a presently preferred aspect, the monitor channel detects occurrence of loss of pressure in the primary hydraulic system, if any brake has unwanted pressure applied, and if a fault is detected on the primary or secondary channels that affects more than one wheel brake on each landing gear.

In a presently preferred aspect of the invention, the primary hydraulic system comprises at least one primary hydraulic fluid control channel and at least one secondary hydraulic fluid control channel, the primary and secondary fluid channels being redundant and partitioned among the plurality of wheel brakes so that even if both the primary and secondary channels fail to apply pressure, braking will be lost to only a portion of the wheel brakes and the loss will be in a symmetrical pattern, and the secondary hydraulic system comprises at least one primary hydraulic fluid control channel and at least one secondary hydraulic fluid control channel. In one currently preferred embodiment, wheel braking power is provided by common fluid channels to adjacent ones of the right and left main landing gear front and aft wheel brakes to provide protection against asymmetrical wheel braking, and primary and secondary fluid channels control all four wheels of the center landing gear. In a presently preferred aspect, the wheel braking power is provided by common fluid channels to the wheel brakes of the center landing gear on an axle pair basis. Typically, the primary hydraulic system comprises three primary hydraulic fluid control channels and three secondary hydraulic fluid control channels that operate simultaneously and independently, and are arranged in redundant pairs of primary and secondary fluid channels, and each pair primary and secondary fluid channels controls the same four wheels.

In a presently preferred embodiment, the secondary hydraulic system provides pressure for alternate braking using dual, independent, closed loop analog control circuits, and the secondary hydraulic system provides dual redundant analog brake-by-wire control in the alternate braking mode for the main and center landing gears of the aircraft. The secondary hydraulic system preferably comprises a plurality of accumulators for providing an alternate supply of hydraulic power, and this alternate supply of hydraulic power is provided for an emergency braking mode in the event that both the primary hydraulic system and the secondary hydraulic system are depressurized. This alternate supply of hydraulic power is similarly provided for an ultimate braking mode providing braking pressure to a plurality of the wheel brakes, and the alternate supply of hydraulic power is also provided for a parking brake mode providing braking pressure to a plurality of the wheel brakes.

The present invention preferably provides for first and second solenoid operated shut-off valves operatively connected to the primary and secondary hydraulic systems, respectively, and to the control unit for selecting operation of one of the primary and secondary hydraulic systems, the first and second solenoid operated shut-off valves being configured to operate in a mutually exclusive manner to position select between operation of the primary and secondary hydraulic systems without the possibility of having both systems pressurized at the same time.

In another presently preferred aspect, the control unit comprises thrust lever switches, and the solenoid operated shut-off valves are implemented through the thrust lever switches to positively prevent pressure from the primary hydraulic system and secondary hydraulic system being applied to the normal or alternate brake metering systems during take off. Typically a landing gear lever is provided controlling retraction of the landing gear, and dual redundant switches on the landing gear lever to bypass the thrust lever switches to stop the wheels during climb when the thrust levers are advanced to enable wheel braking upon retraction of the landing gear. In another preferred aspect, each of the primary brake hydraulic fluid control channels receives a software independent signal that initiates retraction braking for three seconds or until the nose landing gear is up and locked, whichever happens sooner, and an anti-skid function of the normal braking mode is inhibited during retraction braking.

The control unit in a presently preferred embodiment comprises a plurality of servo control valves controlled by corresponding dual solenoid coils for controlling the operation of the wheel brakes, respectively, and the thrust levers comprise dual thrust lever switches that break both power and ground to the first and second solenoid operated shut-off valves for the primary hydraulic system and secondary hydraulic systems when a thrust lever is advanced. Further, the control unit can additionally comprise a plurality of sensors for sensing the position of each brake pedal, such as dual redundant switches that break both power and ground to the first and second solenoid operated shut-off valves, such that depression of either brake pedal opens the first and second solenoid operated shut-off valve for the active hydraulic system. In a currently preferred aspect, the first and second solenoid operated shut-off valves also turn off hydraulic power to the servo control valves during flight. In another presently preferred aspect, the control unit further comprises sensor means for determining brake pedal application and for generating a pedal application signal indicating actuation of the wheel braking system when the brake pedal has been applied, and can also include means for sensing weight on the wheel for generating a brake inhibit signal when weight is not applied on the wheel.

The present invention provides, in a currently preferred embodiment that the servo control valves for controlling the operation of the wheel brakes controlled by dual solenoid coils, and in a further preferred aspect, are also controlled with pressure feedback. Antiskid control is thus preferably provided on each wheel brake utilizing the dual coil servo control valves with pressure feedback. The control unit preferably comprises a pressure sensor mounted downstream of each servo control valve for detecting asymmetrical braking due to unwanted pressure applied to any wheel brake, whereby the monitor channel can select the alternate hydraulic fluid system.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
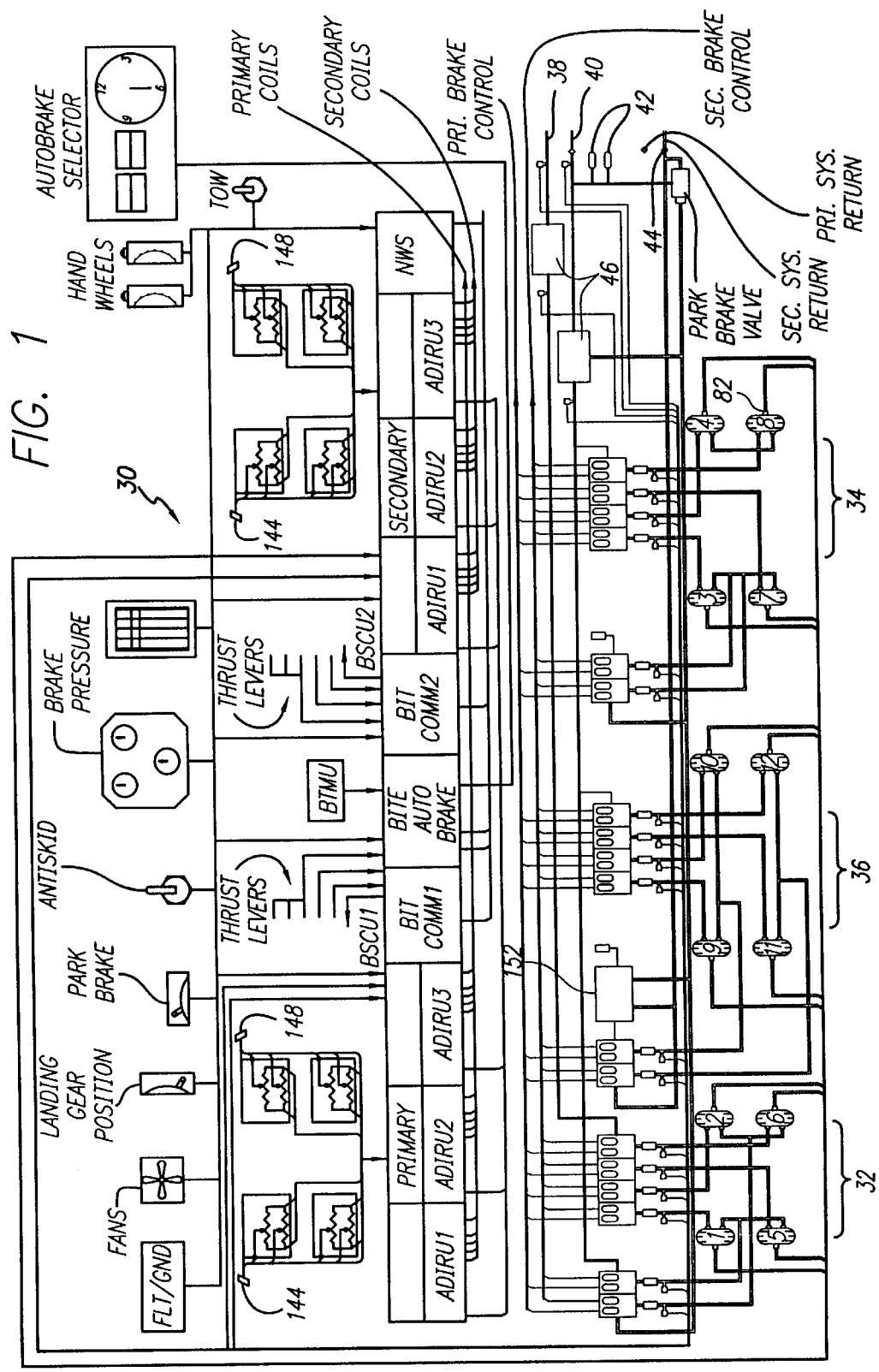
FIG. 1 is a schematic diagram of the braking control system of the present invention.

Catastrophic failure of aircraft landing gear wheel brakes can result from uncommanded brake application on one or more wheels during takeoff, and from the complete loss of braking. Design requirements for substanatially eliminating the probability of such catastrophic braking failure involve eliminating single point of hardware or software failures that can result in such catastrophic failures. The present invention provides an architecture that uses two completely independent means of applying brakes. The normal means of stopping the aircraft uses the primary hydraulic system and a dual redundant, closed loop, digital pressure control system to meter pressure to the normal brake system. The alternate means uses a software independent, closed loop, analog control system to meter secondary hydraulic system pressure to the alternate brake system. Both normal and alternate means of applying brakes operate continuously and autonomously without dependence on information from one to the other.

As is illustrated in the drawings, the invention is accordingly embodied in a braking control system for dual redundant control of hydraulically operated wheel brakes of aircraft landing gear providing protection against inadvertent braking, and separation of braking control through primary and secondary braking control channels using an interface with dual coil brake control valves, such as for a brake and steering control system for an aircraft such as the Airbus A340-500/600.

The present invention provides for a braking control system with a braking and steering control unit (BSCU), which is typically an integrated, digital control unit. The BSCU provides dual redundant digital brake-by-wire, autobrake control, and Nose Wheel Steering capability in the normal mode. The brake control unit also provides dual redundant, analog brake-by-wire for the alternate braking mode. Brake control includes independent antiskid protection, locked wheel protection, touchdown/hydroplane protection, gear retract braking, and comprehensive built-in-test (BIT). In addition to these control functions, the control unit provides ARINC 429 communication with interfacing aircraft systems. The braking and steering control system complies with all of the braking and steering JAR and FAR requirements.

Referring to FIG. 1, the braking control system 30 provides dual redundant, digital brake-by-wire control in a normal or primary braking mode, and dual redundant analog brake-by-wire control in an alternate or secondary braking mode for the left main landing gear 32, the right main landing gear 34 and the center landing gear 36 of the aircraft. Nose wheel steering control can also be provided as an integrated part of the braking and steering control unit. The system provides braking for the eight main gear wheels and the four center gear wheels in the normal, alternate, and emergency braking modes. Ultimate braking and a park brake are provided to the eight-wheels of the main landing gears.

The braking system operates on the primary (normal) 38 and secondary (alternate) 40 hydraulic systems. The primary hydraulic system provides power for normal braking, and the secondary hydraulic system provides power for alternate braking. Two six-liter accumulators 42 for emergency, ultimate, and park braking augment the secondary hydraulic system. A hydraulic check valve 44 provides isolation of the accumulators.

Figure 2:
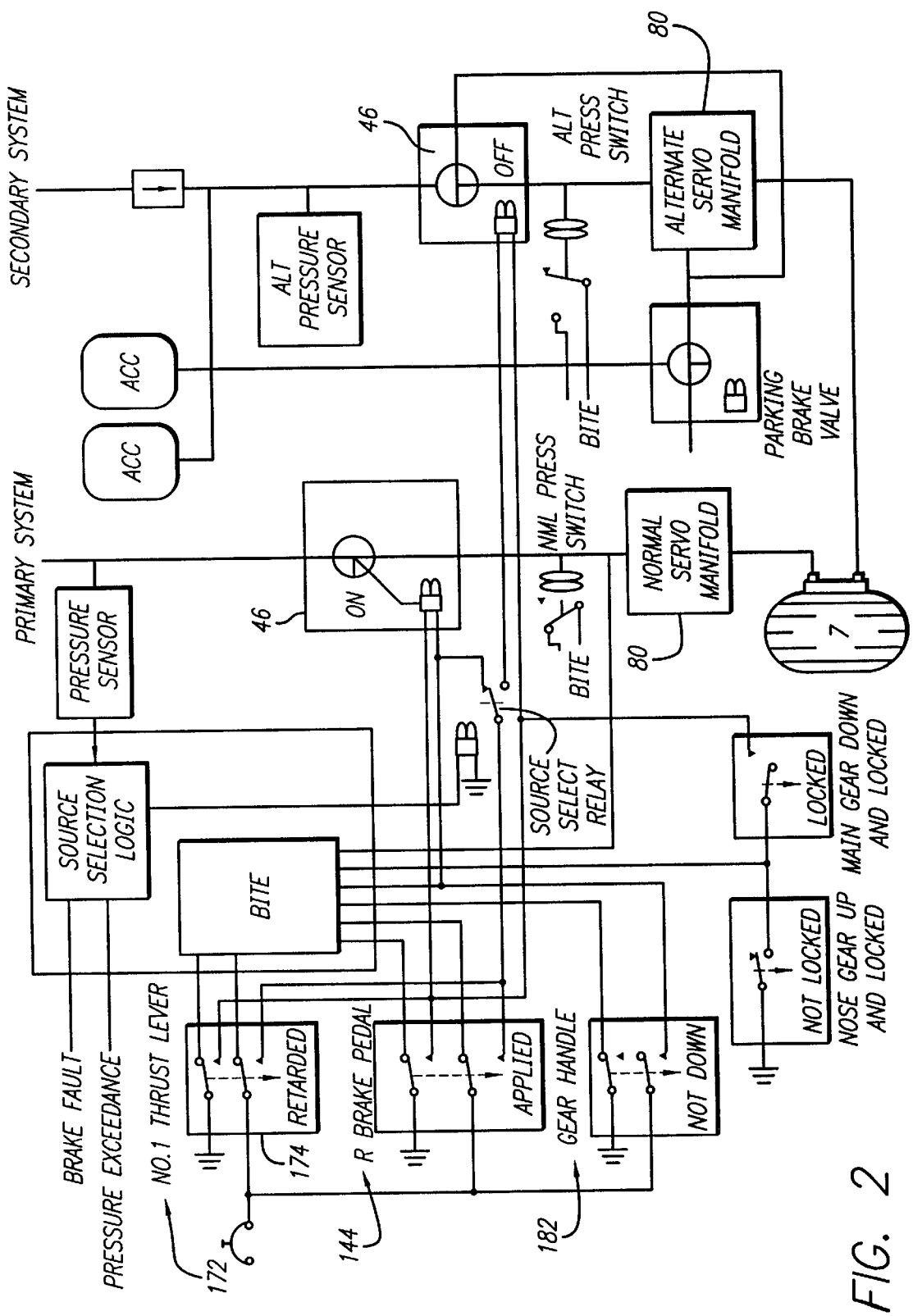
FIG. 2 is a schematic diagram of the hydraulic system brake source selection logic of the braking control system of FIG. 1.

Referring to FIG. 2, hydraulic system selection is performed using two solenoid operated shut-off valves (SSOV's or SOV's) 46. These valves are arranged to operate in a mutually exclusive manner to provide positive system selection without the possibility of having both systems pressurized at the same time, which could damage the brakes. The valves incorporate a soft turn-on feature to avoid undesired hydraulic impulses.

Figure 13A:
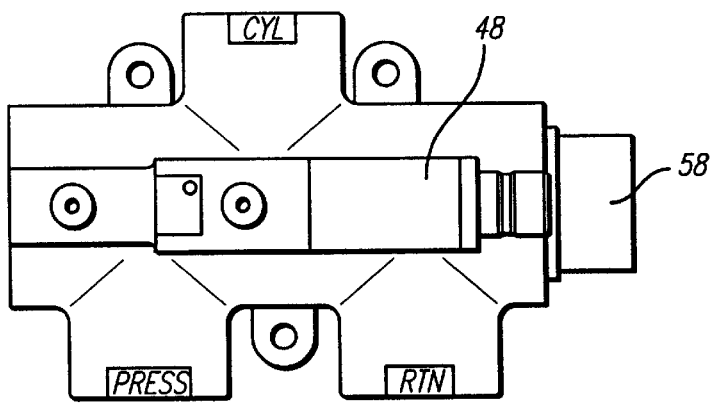
FIG. 13A is a top plan view of a solenoid operated shutoff valve according to the present invention.
Figure 13B:
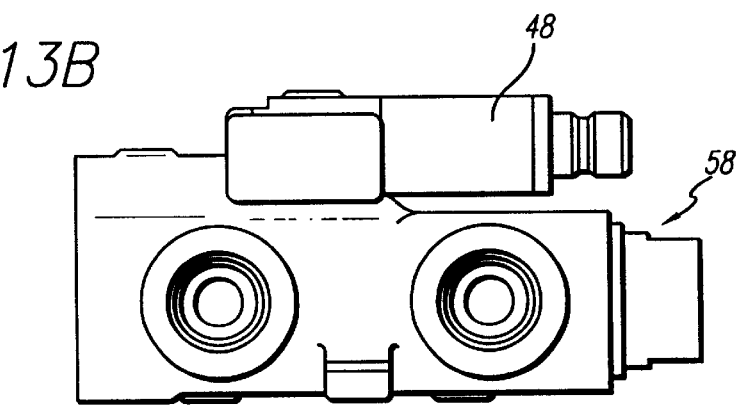
FIG. 13B is a side view of the solenoid operated shutoff valve of FIG. 13A.
Figure 14:
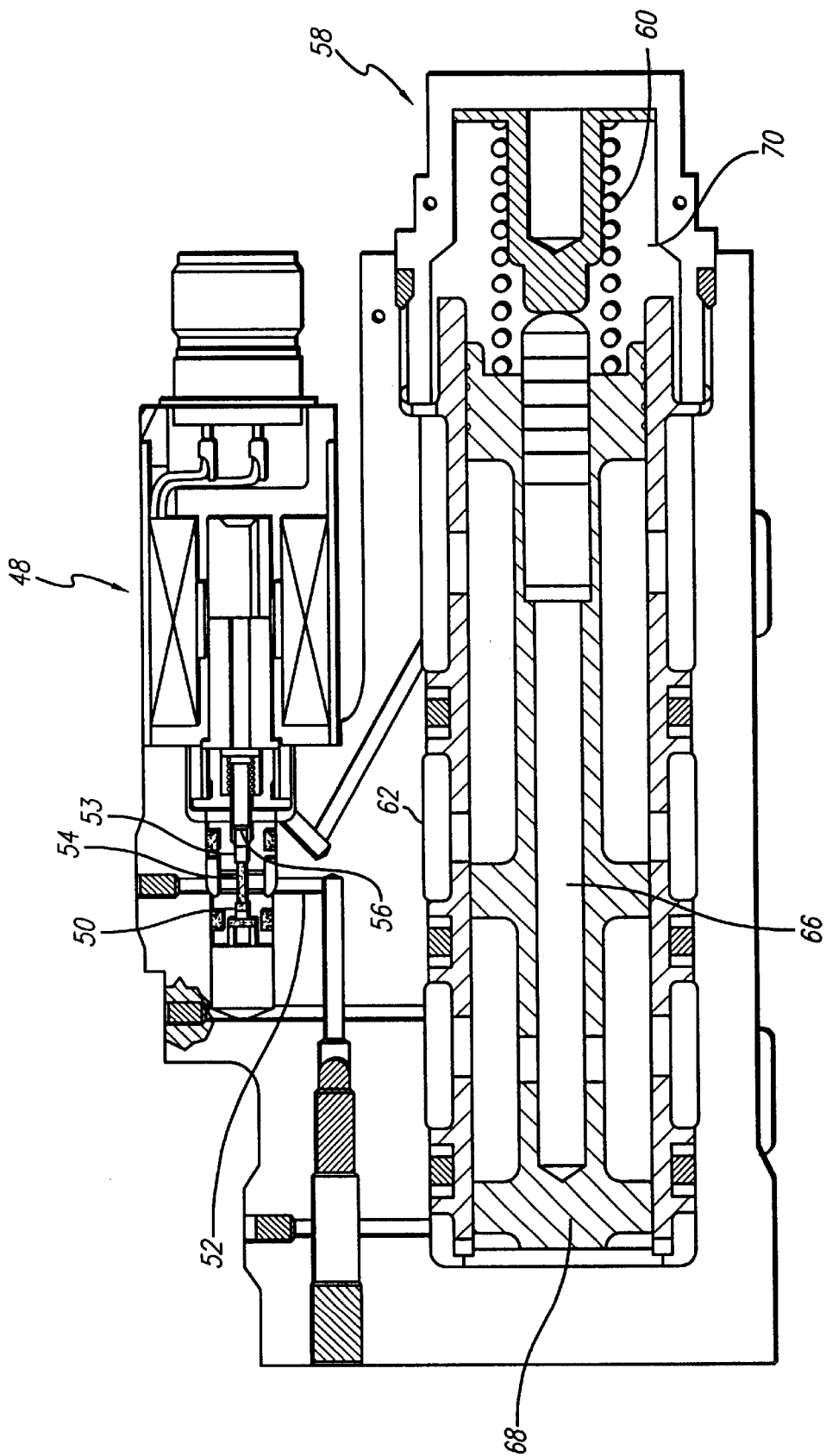
FIG. 14 is a sectional view of the solenoid operated shutoff valve of FIG. 13A and 13B.

Two 3-way solenoid operated shutoff valves are installed one in the primary hydraulic system and one in the secondary hydraulic system for hydraulic system selection, fault isolation, and to minimize hydraulic systems leakage in flight. The envelope dimensions of a system shutoff valve and a cross-section are depicted in FIGS. 13A, 13B, and 14, respectively. The solenoid valve assembly consists of a solenoid valve controlling a spool-sleeve valve 48. The solenoid valve portion is a two ball normally closed type. One ball 50 connects or isolates supply pressure to the spool position control port 52 while the other ball 53 performs the same type of function for return pressure. With the solenoid de-energized, pressure holds the supply pressure ball 50 against the seat sealing off the control port 52. A small pintle 54 pushes the return pressure ball 53 off its seat and connects the control port to return pressure. When the solenoid is energized, the plunger pushes the pin 56 which seats the return pressure ball 53 and through the pintle pushes the supply pressure ball off its seat. In this position the control port is connected to supply pressure and isolated from return pressure.

The second stage is a spool-sleeve valve 58 pressure driven in both directions. The spring 60 holds the spool to a position, opening the cylinder port 62 to return and blocking the pressure port (closed position) when the solenoid valve is de-energized or/and system pressure is not present. The spring also provides a fail energized function. When pressure is present it acts on the area of the bullet piston 66 and exerts a 200 pound closing force holding the spool to in the closed position. In this de-energized condition, the control pressure chamber 68 is vented to return through the solenoid valve. The spring end chamber 70 (opposite the control pressure chamber) is always vented to return. When the solenoid valve is energized, pressure is ported to the control pressure chamber on the spool and acts on the main spool area. This generates an opening force of 400 pounds. This force overcomes the constant 200 pound force and strokes the spool to the open position with a net force of 200 pounds. With the spool in this position, the pressure port is open to cylinder and the return port is blocked. Internal orificing within the spool can be sized to provide damping and spool stroke rates that avoid undesirable fluid momentum pressure spikes (water hammer).

Figure 3:
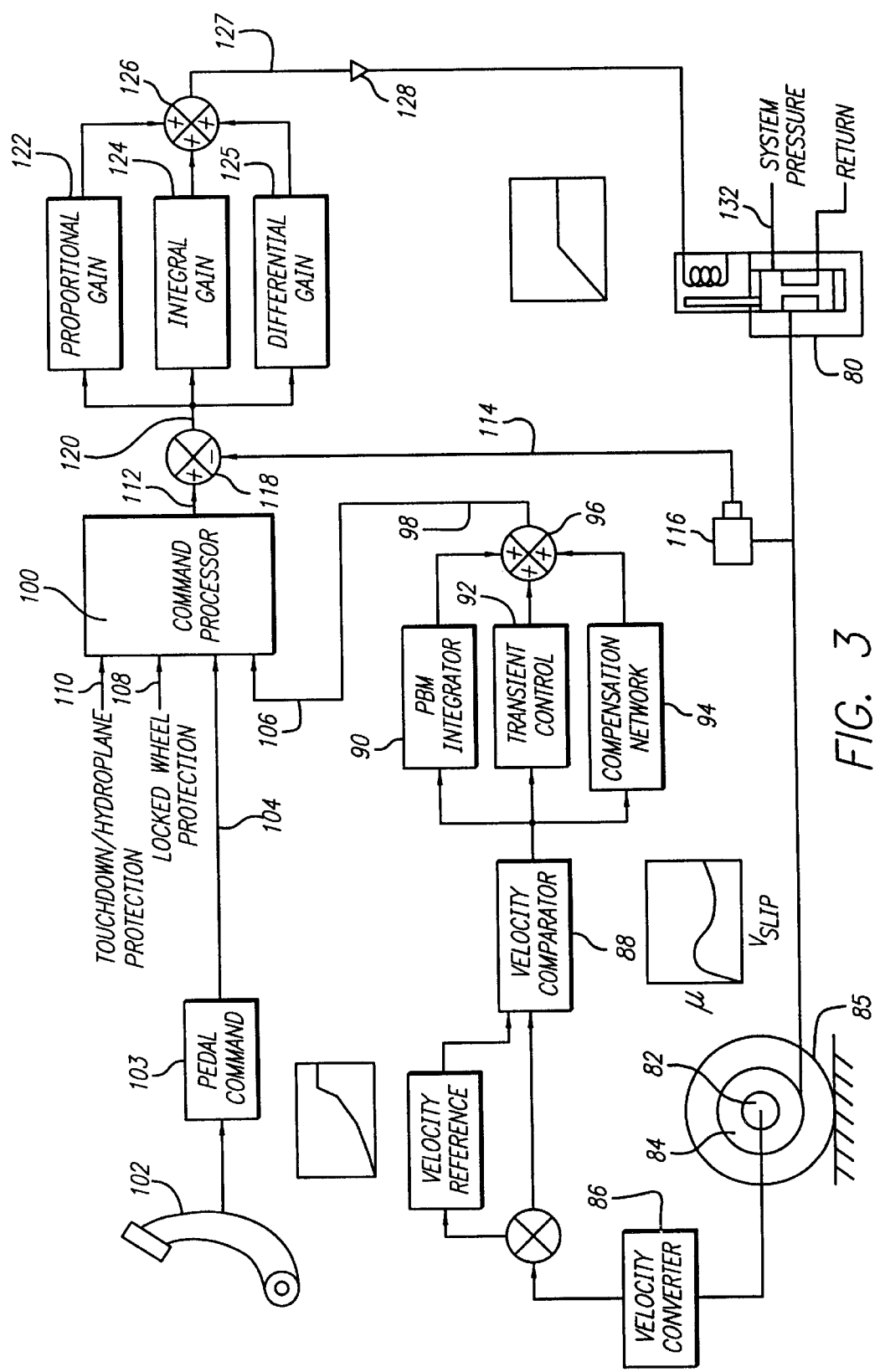
FIG. 3 is a functional block diagram of the brake-by-wire system of the braking control system of FIG. 1.

With reference to FIG. 3, normal braking is performed through a dual redundant, digital brake-by-wire architecture. Pressure and antiskid control is performed on each wheel using dual coil servo valves 80 with pressure feedback. This allows each channel to independently control the pressure of each brake commensurate with the level commanded by the brake pedal position sensors. The dual coil servo valves also provide adequate channel separation for redundancy management. The brake-by-wire algorithm provides smooth brake application without torque spiking or brake grab. As installed for an aircraft preferably includes a wheel speed transducer 82 for each wheel brake 84 of a wheel 85 of the aircraft, for measuring wheel speed and generating wheel speed signals that are a function of the rotational speed of the brake wheel. The wheel speed signal is typically converted to a signal representing the velocity of the aircraft by a velocity converter 86, and compared with a desired reference velocity in velocity comparator 88, to generate wheel velocity error signals indicative of the difference between the wheel velocity signals from each braked wheel and the reference velocity signal. The output of the velocity comparator is referred to as slip velocity (Vs) or velocity error. The velocity error signals are adjusted by a pressure bias modulator control means (PBM) integrator 90, the transient control means 92, and compensation network 94, the outputs of which are summed at summing junction 96 to provide an antiskid control signal 98 received by the command processor 100, typically a microprocessor. The PBM integrator in the antiskid loop dictates the maximum allowable control pressure level during braking. The PBM integrator is typically slower in response than other control parameters needed to detect and control initial skid. When no skid is detected, this integrator allows full system pressure to the brakes.

The position of the aircraft brake pedal 102 operated by the pilot is typically read by a microcontroller 103 that generates a brake pedal command signal 104, from which a pressure application profile is determined. The command processor 100 receives the brake pedal command signal, the antiskid control signal 98 via feedback line 106, and preferably also receives a locked wheel protection signal 108 indicating whether a wheel is locked, and a touchdown/hydroplaning protection signal 110, to guard against hydroplaning of a wheel on touchdown at high speeds or on slippery runway surfaces at speeds above 50 knots. In a currently preferred embodiment, the command processor operates on the lowest input of the locked wheel protection signal, the touchdown protection signal, the pedal signal, and the antiskid signal. The commanded brake pressure signal output 112 of the command processor is compared with the brake pressure feedback signal 114 from brake pressure sensor 116 by comparator 118, which generates an output pressure error signal 120.

In a currently preferred embodiment, the brake pressure error signals are also adjusted by a proportional gain by proportional gain circuitry 122, an intergral gain by integral gain circuitry 124, and a differential gain by differential gain circuitry 125 that together form a PID control loop, and the outputs of which are summed at summing junction 126 to provide an adjusted brake pressure signal 127. The adjusted brake pressure signal is also typically amplified by valve amplifier 128 to provided an amplified brake control signal applied to the brake control valve 80 that controls the application of pressurized brake fluid from system pressure 132 to the wheel brake. In a presently preferred embodiment, these functions can be performed by one or more microprocessors under appropriate software control, although alternatively these or analogous functions may be performed by suitable hardware components.

The system will provide differential braking capability for steering the aircraft with the nose gear free castoring from either the Captain's or First Officer's brake pedals. Four dual redundant brake pedal potentiometers provide the Captain/First Officer pedal position information to the braking computer. The pedal potentiometers provide Captain/First Officer pedal position information to the braking computer. Wheel speed information is derived from twelve, axle mounted, wheel speed tachometers. The wheel speed tachometers are variable reluctance devices. The outputs of the wheel speed tachometers are proportional to the rotational speed of the wheels.

Brake pressure information is derived from eighteen brake pressure transducers. The pressure transducers are 4–20 ma current output devices. The current transducers were chosen because they significantly reduce aircraft wiring, are highly reliable, and are relatively immune to electrical interference.

System pressure availability is determined through two upstream pressure switches. One pressure switch is connected to the primary hydraulic system the second is connected to the secondary hydraulic system. A pressure transducer in the secondary system downstream of the check valve provides accumulator pressure indication to the brake control and cockpit.

Figure 4:
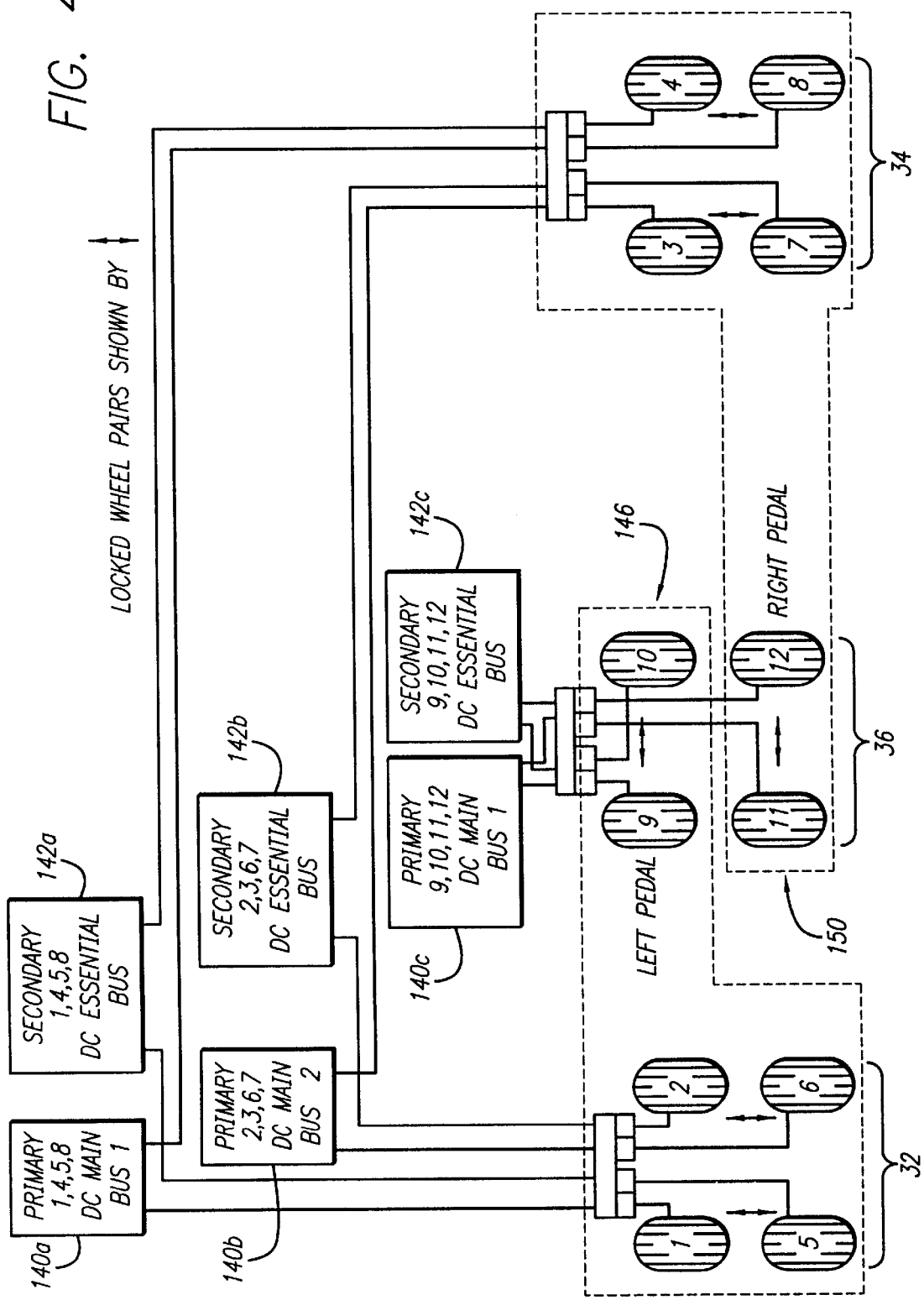
FIG. 4 is a diagram illustrating the control partitioning for the normal primary hydraulic braking system of the braking control system of FIG. 1.

As is illustrated in FIG. 4, the braking control system preferably consists of six channels of brake control: three primaries 140a, 140b, 140c, and three secondaries 142a, 142b, 142c. The six channels are arranged in redundant pairs of a primary and secondary, each pair controlling the same four wheels. The primary and secondary systems operate simultaneously and independently. The scheme ensures that the loss of a redundant pair of control channels will not lead to asymmetric braking. In FIG. 4, locked wheel pairs are shown by the double arrows. For the main gears, locked wheel protection is done on a tandem basis rather than on an axle basis. This maintains full separation between channels to prevent the possibility of fault propagation.

The center gear is arranged so that the left brake pedals 144 control the front axle pair 146 and the right brake pedals 148 control the aft axle pair 150. This is done to avoid cyclic torsional fatigue loading of the structure. Two redundant channels control all four wheels of the center gear. For the center gear, locked wheel protection is done on an axle pair basis. The pairing arrangement for center gear can readily be changed.

Figure 5:
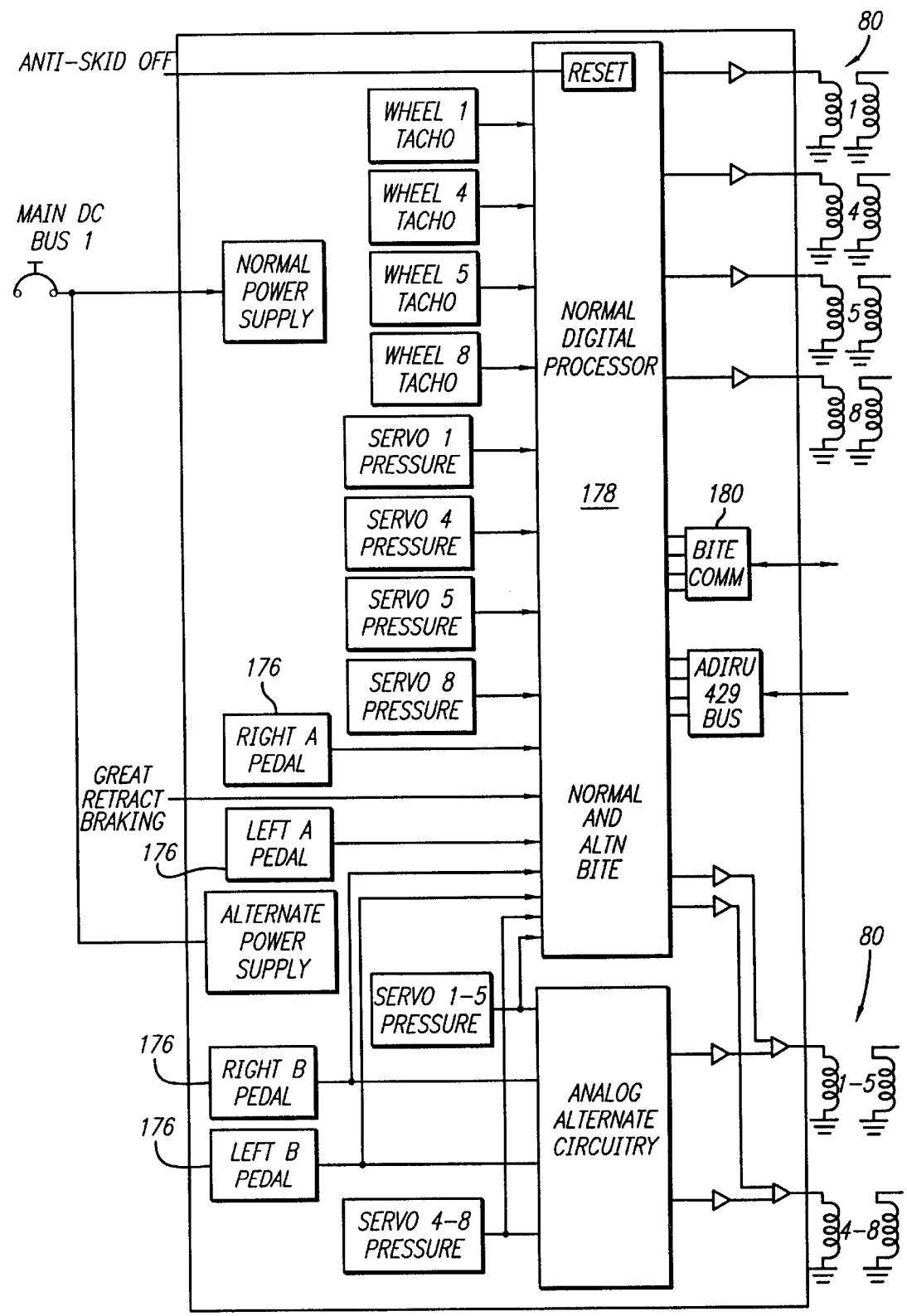
FIG. 5 is a functional block diagram for the normal, primary brake control and the alternate, secondary brake control of the braking control system of FIG. 1.

Referring to FIG. 5, autobrake control with five landing mode deceleration settings and an RTO (Refused Take Off) mode is provided for the normal brake system. In FIG. 5, only a primary channel is shown, however the secondary channel is identical to the primary channel, except that the other coil of the servo valve is used. The normal system servo valves 80 are used for autobrake pressure application. Pressure feedback control is used in the autobrake control mode the same as in pedal braking mode to ensure equal load distribution amongst all the brakes.

Alternate braking is performed on a paired wheel basis on the secondary hydraulic system using a dual redundant, analog brake-by-wire pressure control system. The proposed wheel pairing is the same as the locked wheel pairing on the normal system. This allows a simple approach where both normal and alternate antiskid control can be provided by the same control channel. A further advantage of this pairing is that during operation on slushy or icy runways, where a pair of tandem wheels tends to encounter a rut or strip of ice, only the tandem pair is released instead of the entire gear as would happen using axle pairing. FIG. 5 shows how the antiskid commands from the primary channel and the pressure command from the alternate analog are combined by hardware in the alternate control channel to produce the alternate servo valve control command.

Figure 6:
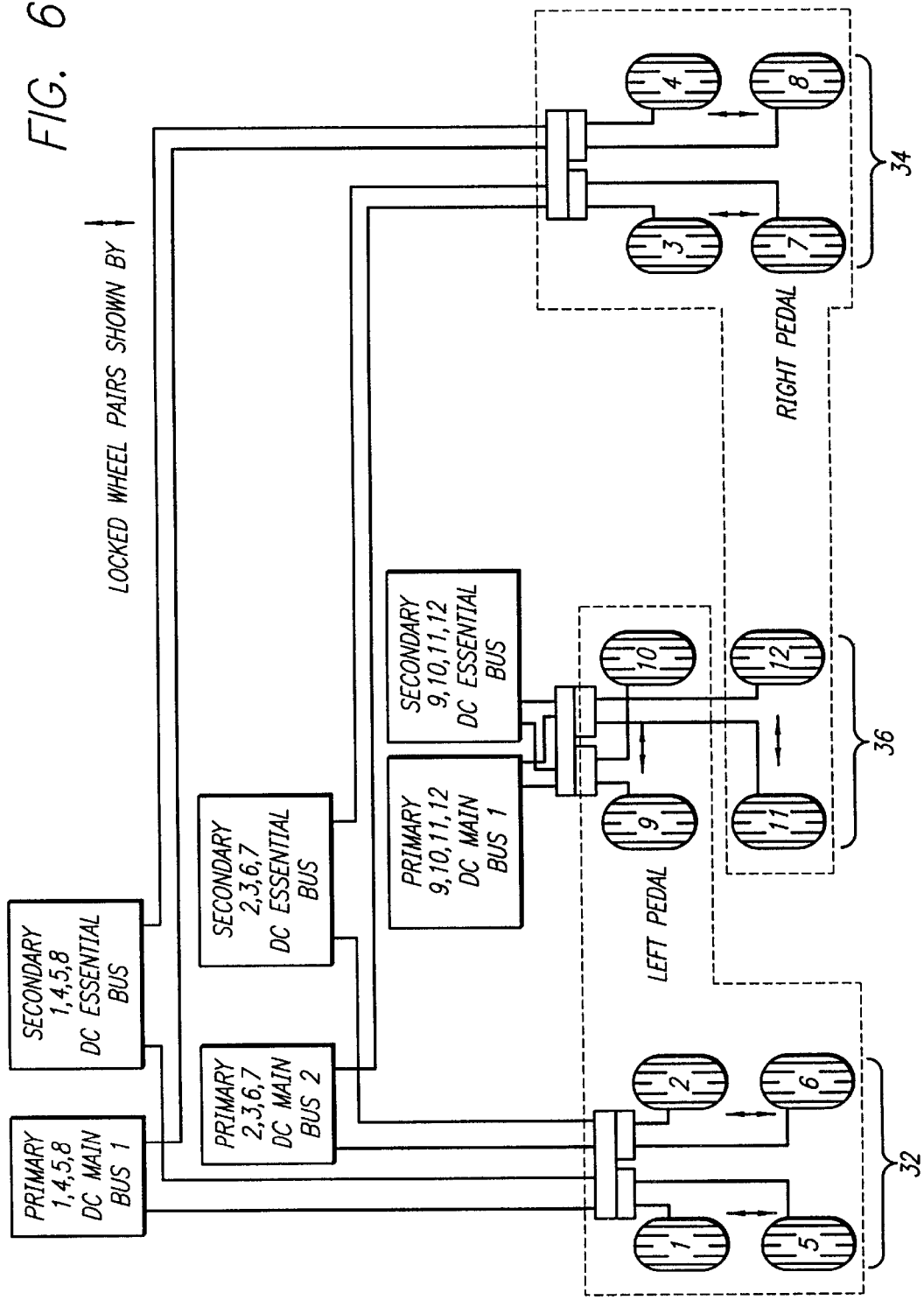
FIG. 6 is a diagram illustrating the control partitioning for the alternate, secondary hydraulic braking system of the braking control system of FIG. 1.

FIG. 6 shows the partitioning for the alternate brake system. The flight crew will be unaware of any difference in system operation when using alternate brakes or during switch over to the alternate from normal, except for the appropriate cockpit indication. Pedal application on the alternate system follows a pressure gain profile identical to that on the normal brake control.

Emergency braking mode uses the accumulators on the secondary system and the essential electrical bus. The emergency braking system allows braking when all electrical power generation is lost or both primary and secondary hydraulic power generation is lost. In the emergency mode, the alternate braking system is used with antiskid protection turned off. Operation of the antiskid switch places all digital processors in the reset mode positively inhibiting the antiskid function to all brakes (shutting down brake control power supplies may be used if deemed necessary).

Figure 7:
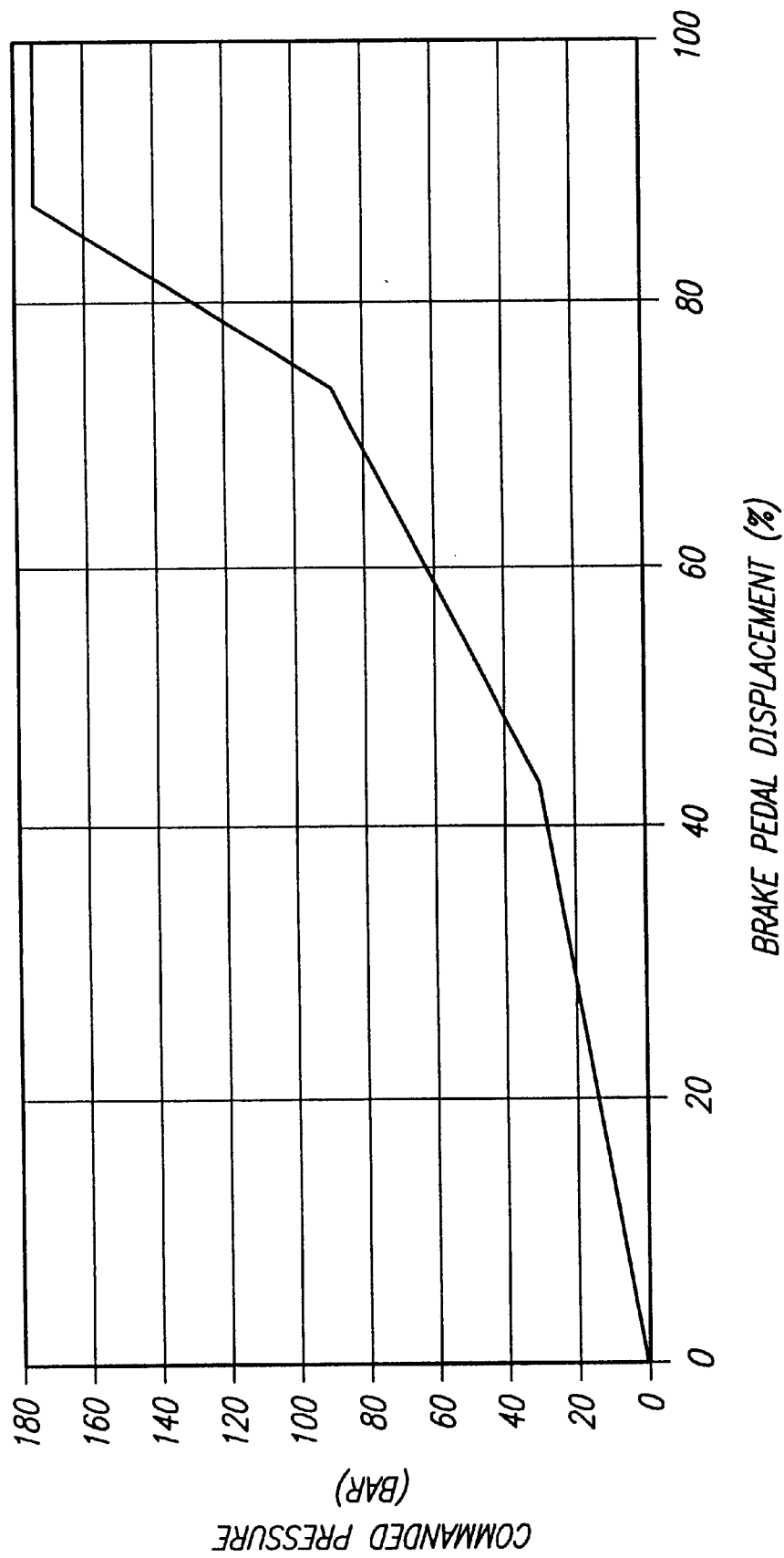
FIG. 7 is a chart of the commanded brake pressure vs. the corresponding brake pedal displacement of the braking control system of FIG. 1.

The emergency braking system provides braking to center landing gear and main landing gear wheels. Seven pedal applications from brake contact pressure to 100 bars minimum can be made on the emergency braking system. This performance is achieved by using the same accurate, brake-by-wire, pressure control algorithm as used in the alternate braking mode, as illustrated in FIG. 7.

Figure 8:
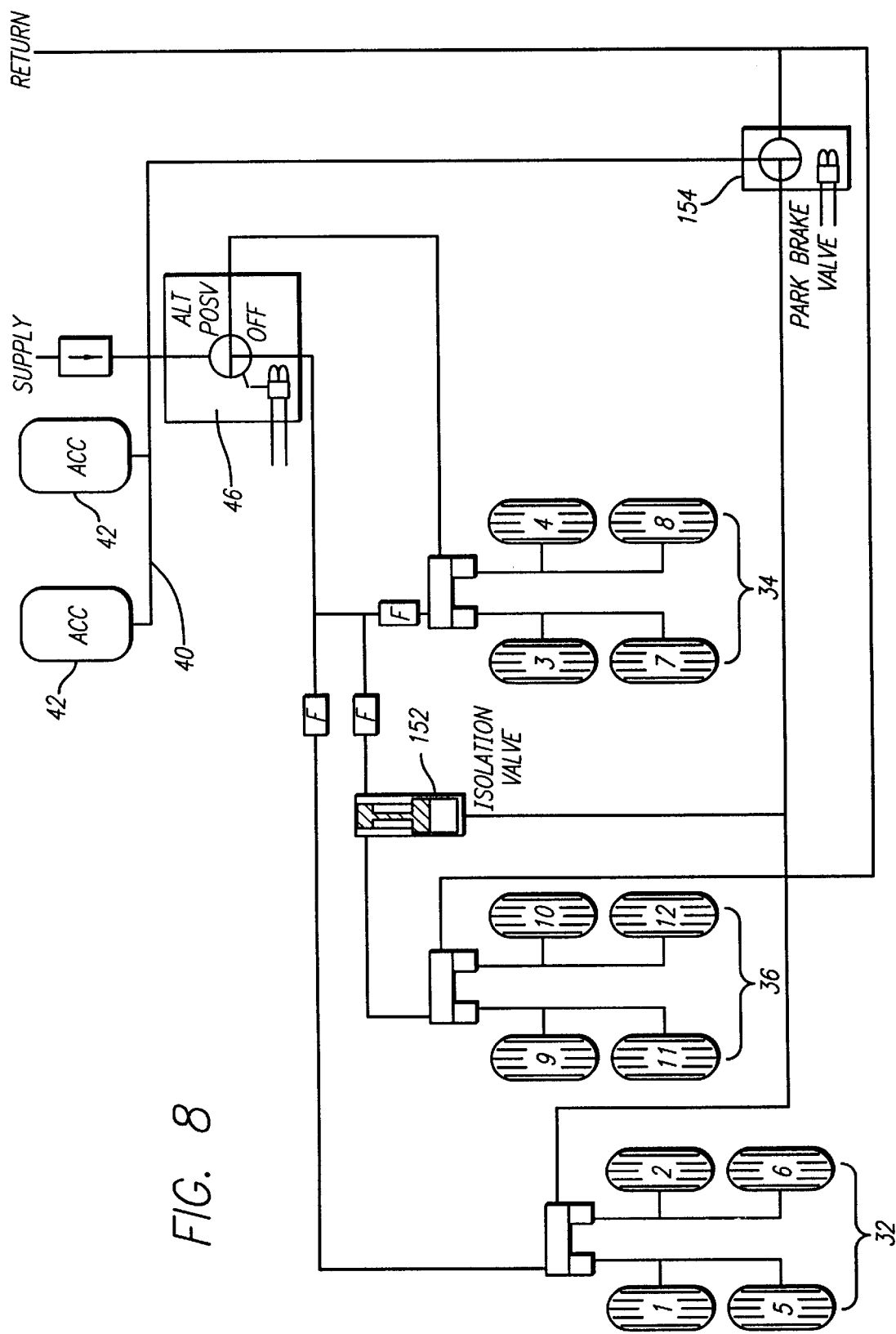
FIG. 8 is a schematic diagram of the parking brake subsystem of the braking control system of FIG. 1.

Referring to FIG. 8, the parking brake provides 175 bars to the eight main landing gear brakes. A latching solenoid operated valve is used to provide accumulator pressure from the secondary system to the eight main landing gear brakes. Pressure application is through the return path of the alternate braking servo valves. This method reduces component count by eliminating extra shuttle valves and provides reduced leakage and longer parking time. Lap leakage of the alternate servo valves on the main gear is not a factor, since the 3 way Solenoid Operated Shut-Off Valve (SOSV) will be in the pressure to brake mode, therefore reducing leakage dramatically. An isolation valve 152 in the pressure supply line of the servo valves for the center gear blocks this leak path when the return line is pressurized. The park brake valve 154 limits brake pressure to 175 bars even when the accumulator is charged to 206 bars.

The secondary hydraulic system also provides pressure for the park brake valve. Two six-liter accumulators back up the secondary hydraulic system. These accumulators will provide extended park pressure. A latching solenoid park brake valve provides park pressure through the return port of the alternate servo valves. The position of the park brake valve is fed back to the control unit through a position switch that is incorporated in the valve.

Return side check valves are provided to avoid any back flow due to various hydraulic failure modes. The braking and steering control unit actively monitors accumulator pressure. The brake control unit supplies power and return signals to the two 3 way SOSV's (Solenoid Operated Shutoff Valves) that are connected to hydraulic system primary and hydraulic system secondary. The shutoff valves provide means of controlling inlet pressure to the brake control valves. The approach provides exclusive system selection along with isolation of faulty hydraulic components in case of a failure. The shutoff valves are also used to turn off hydraulic power to the servo valves during flight. Pressure switches located on the outlet of the primary and secondary system SOSV facilitate fault detection and isolation by the control unit. The control unit commands and controls brake pressure through twelve dual coil brake control valves in the normal channel and eight dual coil brake control valves in the alternate control channel.

Each brake control servo valve is protected against hydraulic leaks with a volumetric fuse. A fuse is used between the brake control valve outlet and the brake inlet. This prevents reservoir depletion in case of a broken line anywhere downstream of the brake control valve.

If both the normal and alternate braking systems are lost, the ultimate braking feature provides 175 bars pressure to the eight main landing gear brakes to stop the aircraft. Ultimate braking is engaged by operating the electrical park brake switch. The safety considerations that were used in establishing the architecture described above are discussed below.

Figure 12A:
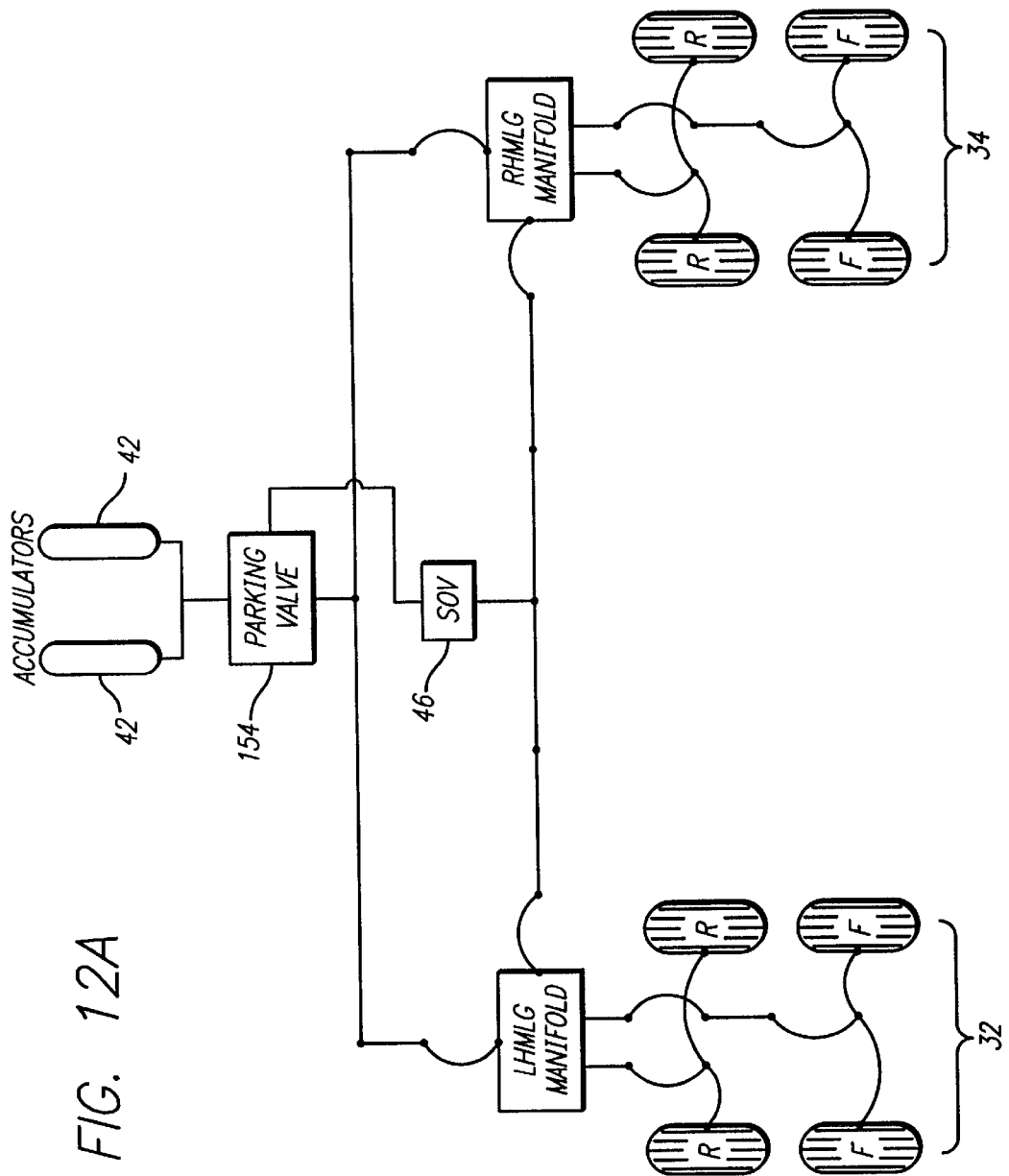
FIG. 12A is a schematic diagram of the park braking hydraulic fluid distribution scheme of the braking control system of FIG. 1.
Figure 12B:
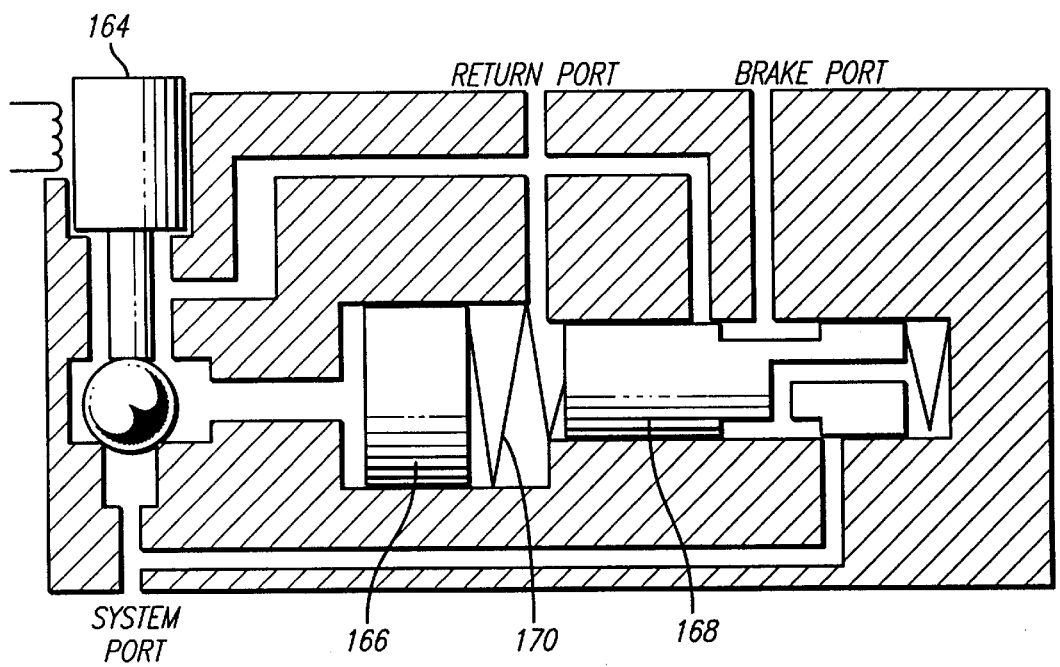
FIG. 12B is a schematic diagram of the park/ultimate braking valve of FIG. 12A.

Referring to FIG. 12, the hydraulic accumulators for the parking brake will be capable of maintaining parking brake pressure of 175 bar at all eight main landing gear wheels for a period of 12 hours. After initial brake application, from the secondary hydraulic system, the parking brake pressure is maintained at 179 bar for a 12-hour period. The two 6 liter accumulators are thus sufficient to comply with the requirements for parking/ultimate braking and for Emergency braking.

The park/ultimate brake valve 154 includes the following components: *a*) a latching three-way solenoid valve 164; *b*) a spring loaded piston 166; *c*) a three-way, metering spool valve 168; and *d*) a bias spring 170. The magnetic circuit of the latching solenoid is designed to hold the solenoid plunger in the energized de-energized position after removal of electrical power to the coil. The solenoid must be driven from one state to the other. The valving element of the latching solenoid consists of a spring-loaded poppet metering on a hard steel seat. A three-way proximity switch provides solenoid plunger position status. The pressure metering spool is designed so that with no pressure applied, a bias spring holds the spool in a position that allows porting of the alternate brake valve module return line to the secondary system return line port. When pressure is applied, the metering spool will move the main spool to provide brake pressure regulated at 175 bar. High overlap ensures extremely low pressure to return leakage. Based on the parking brake valve leakage of 6 cm3/hr, the brake pressure will be at 178 bar after a 12-hour parking period of the aircraft on the two six liter accumulators initially pressurized to 206 bar.

Since a low pressure can be used to actuate the valve (<40 bar), the design ensures that the full accumulator pressure stays applied to the parking brake if accumulator pressure should drop below the 175 bar level. Additionally the valve acts as a thermal relief valve in case parking brake pressure exceeds a preset limit due to fluid expansion.

The strict performance requirements for the braking control system preclude the exclusive use of software and hence the approach taken is to use hardware interlocks through the thrust levers 172 to positively prevent pressure from the primary or secondary hydraulic systems being applied to the normal or alternate brake metering systems during take off. FIG. 2 shows the right brake pedal and No. 1 thrust lever. The left brake pedal and No. 3 thrust lever are not shown but are similar to the right brake pedal and No. 1 thrust lever of FIG. 2. FIG. 2 also shows the solenoid operated shutoff valves (SOSVs) used to block the pressure from the primary and secondary hydraulic systems if one or more thrust levers is at or above the minimum take off thrust setting. The valves are forced closed by supply pressure to minimize the probability of sticking owing to contamination. Both primary and secondary hydraulic systems are vented to low pressure when the solenoid valves are in the closed position.

Dual switches 174 break both power and ground to the solenoid coil for the primary and secondary systems when either the No. 1 or No. 3 thrust lever is advanced. The monitor channel detects disagreement between two switches mounted on the same lever. The switches are spring loaded to the advanced position so that if a switch falls off its mounting, it will fail safe. The pressure downstream of each solenoid valve is monitored to detect mechanical failures. It is assumed that the case of an engine ferry using the No. 1 or No. 3 engine position will be handled by procedure. This scheme positively prevents the application of brakes with take-off thrust applied but it also introduces a performance deficit during a brake pedal initiated Refused Take Off (RTO) stop. Flight crew procedures require the pedal brakes to be applied before the thrust levers are retarded and, without the addition of pedal logic, RTO brake application would be delayed. This shortcoming is avoided by sensing the position of each brake pedal using software independent, hard-wired switches. Depression of either brake pedal opens the valve for the active hydraulic system as shown in FIG. 2. The switches are dual redundant, break both power and ground to both valves, and are monitored for passive failures. In the event of the loss of all engine-driven generators, both valves move to the closed position.

As discussed above, the normal brake system consists of six channels of brake application: three primaries and three secondaries. Referring to FIG. 5, each of the four brake pedals, Captain's Right, Captain's Left, First Officer's Right, and First Officer's Left is equipped with a position sensor 176. The monitor channel digital processor 178 compares the positions measured by each sensor to detect passive failures. The pressure sensors measure the pressure at each brake to minimize the error between brake pressure and pedal position so that equal pressures are applied to all brakes. If one of the channels fails to command pressure, the dual coil servo valve allows the other channel to control the brake pressure independently. The channels are partitioned so that, even if both the primary and its secondary channel fail to apply pressure, braking will be lost to four brakes only and the loss will be in a symmetrical pattern. In the event that the primary hydraulic system loses pressure, or any brake has unwanted pressure applied, or a fault is detected on the primary or secondary channels that affects more than one brake on each landing gear, the monitor channel will switch to the secondary hydraulic system as the source of braking pressure.

The braking control architecture described was evaluated against the failure condition requirement for "loss of normal braking availability". The failure probability requirement for this condition is $1 \times 10^{-6}$ (per flight hour). The current architecture is based on an Active/Active control where primary and secondary channels operate simultaneously and autonomously. This architecture has numerous benefits in redundancy management and system operation. The proposed architecture is flexible enough to provide an Active/Standby control with more complex redundancy management in the BITE cards 180. Using this approach, BITE shuts down a normal channel that is determined to be faulty and operation continues using the second channel of the normal system without switching to the alternate brakes. This approach can further be augmented by incorporating dual element pressure transducers into the Active/Standby control.

The secondary hydraulic system provides pressure to the alternate brake system using dual, independent, closed loop analog control circuits. Three primary and three secondary channels are also provided for dual redundant, independent means of applying brakes. As in the normal system, dual coil servo control valves are used to ensure that if one channel fails to apply pressure, the remaining channel can apply pressure to the commanded value.

In the event that both the primary and secondary hydraulic system are depressurised, emergency braking can be accomplished using the brake accumulators installed in the alternate brake system. As a last resort, the ultimate braking system can be used to stop the aircraft by operating the Park Brake switch. On the normal system, combining the pressure application and pressure reduction commands in software produces the servo valve signals. On the alternate system, the anti-skid pressure reduction command for each brake pair is combined in hardware with the independent pressure command from the analog circuit. The partitioning of the channels ensures that a failure causing loss of brakes will be confined to four wheels only and will be distributed symmetrically. This approach assumes that all digital control systems will not fail simultaneously because of a specific set of system conditions. It is believed that this theoretical event is not applicable for small, relatively simple state machines such as brake control systems. The proposed approach has been successfully certified on many aircraft models over the last twenty years. The provision of an Antiskid Off switch and an ultimate braking system diminishes the probability of loss of all braking owing to an antiskid malfunction to below $1 \times 10^{-9}$.

Another significant failure is the loss of gear retraction braking. This would allow a wheel with a loose tire tread to enter the wheel well while spinning The hardwired interlock used to prevent application of brakes during take-off, conflicts with the requirement to stop the wheels during climb when the thrust levers are advanced. Retraction braking is enabled by using dual redundant switches on the landing gear lever 182 to bypass the thrust lever switches as shown in FIG. 2. The landing switches are monitored for passive failures. Also referring to FIG. 9, gear retract braking is applied only from the primary system and so the landing gear lever switches do not inhibit the secondary system SOSV. This reduces the probability of the loss of alternate braking. The required probability for this event prohibits the use of a single processor for applying brakes. Each of the normal brake control channels receives a software independent signal that initiates retraction braking. A brake pressure profile is applied to each brake through the normal servo valves for three seconds or until the nose landing gear is up and locked, whichever happens sooner. The anti-skid function of all normal processors is inhibited during retraction braking.

The need to preclude asymmetric braking as a result of the loss of or extra braking on one main landing gear is another significant consideration in the control of aircraft braking. The partitioning scheme used for normal and alternate anti-skid functions shown in FIG. 5 prevents the loss of braking owing to incorrect antiskid activity as result of control system failure or loss of aircraft power. The pedal switches and sensors are dual redundant and are monitored. If one of the pedal sensors fails to the non-braking position, the redundant channel will apply brakes using the command from the other sensor.

Figure 10:
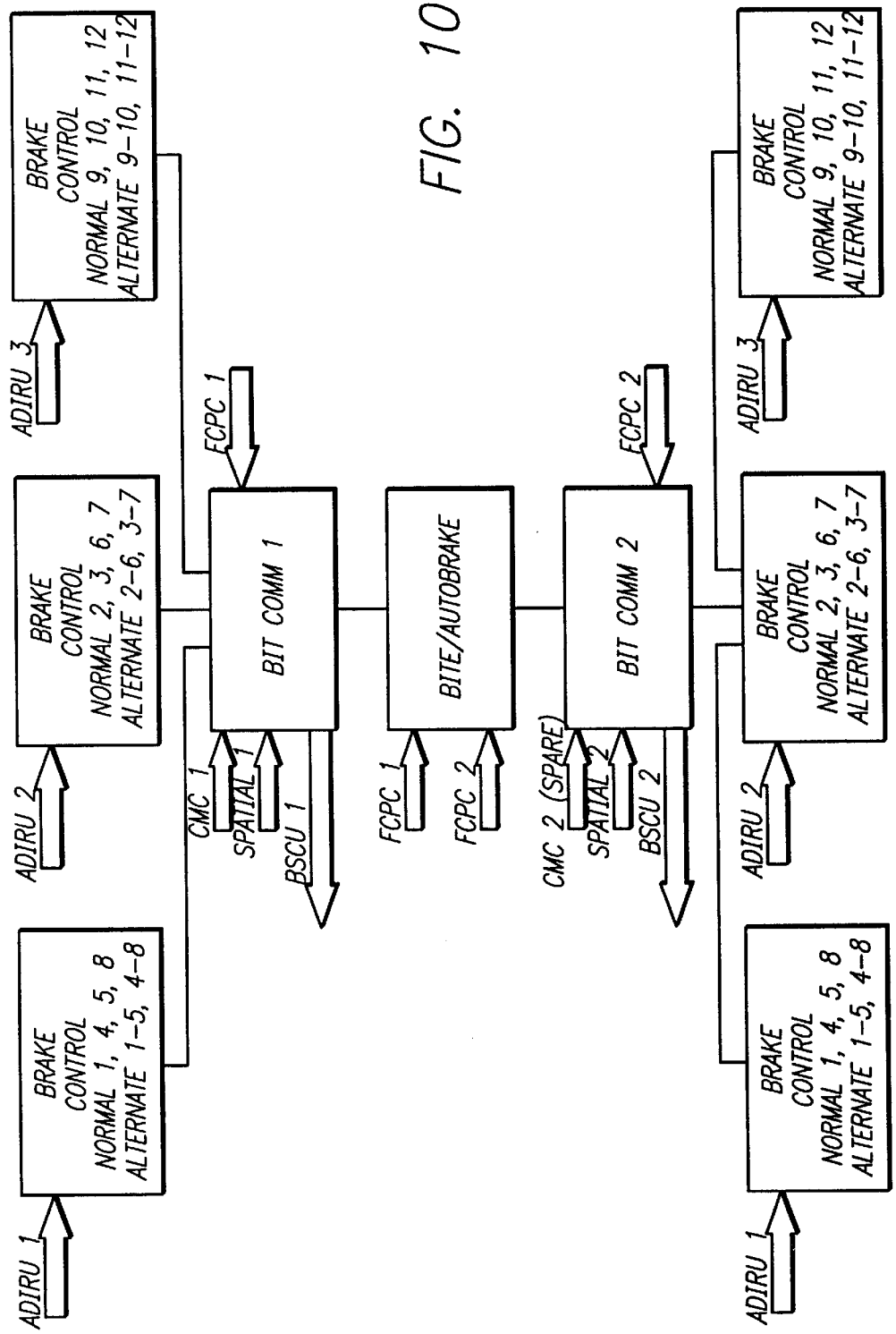
FIG. 10 is a schematic diagram of the brake signal partitioning of the braking control system of FIG. 1.

The signal partitioning shown in FIG. 10 also prevents the undesired asymmetrical release of brakes owing to an ADIRU signal failing to the Groundspeed high mode. A voting scheme was considered that brought all three ADIRU buses to each digital brake control channel, but this was rejected because of the high component count and concerns about fan out burden on the ADIRU ARINC 429 transmitters. A second voting scheme whereby the Monitor Card would vote on the ADIRU channels and pass a signal to the brake control channels was rejected because of the possible of single point failure in the Monitor Card. Asymmetrical braking can result from unwanted pressure being applied to any brake. Pressure sensors mounted downstream of each servo valve detect this condition and the monitor channel select the alternate system thus bypassing the failure.

Referring to FIG. 10, the braking and steering computer has this following circuit board sub components:
Primary Normal/Alternate
    Braking Channel 1—3 cards
Secondary Normal/Alternate
    Braking Channel 2—3 cards
    BIT/COMM1—1 card
    BIT/COMM2—1 card
    BITE/Autobrake—1 card Steering Control—1 card In the normal braking system six brake control cards provide dual redundant digital brake-by-wire controls. Three cards provide control for channel 1 and three cards provide redundant control on channel 2. The BITE/Autobrake card provides normal system BITE (Built-In-Test Equipment) and Autobrake. The normal system BITE card also provides mutually exclusive hydraulic system selection. Communication with the brake control and steering cards is handled through the BIT/COMM cards. The BIT/COMM cards perform local built-in-test and transfer information to the BITE card for failure isolation. The Normal/Alternate braking cards provide alternate braking control. These cards perform brake-by-wire pressure control similar to the normal braking mode without using software. Alternate control BITE is performed by the normal system BITE card. The BITE provides extensive test and communication capability for the alternate control channel.

A cockpit mounted Autobrake switch panel provides the means for the flight crew to select one of the five landing decelerations or an RTO mode. The five landing deceleration levels are indicated as LO, 2,3,4, and HI. An RTO selector switch provides RTO mode selection to the brake control unit. The Captain or the First Officer will choose a deceleration setting and the brake control system will provide signals to allow the switch to latch to the selected deceleration position. The autobrake card will illuminate the Active light when autobrake starts pressure application. The autobrake card will illuminate the decel light when the aircraft deceleration is within 80% of the selected deceleration. When RTO is selected and armed, the autobrake card will illuminate the RTO Armed light on the autobrake switch panel.

The braking control unit will provide brake control function when the associated +28 VDC power supply is energized. Brake control consists of the following functions as a minimum:
    1. Pedal Command
    2. Antiskid Protection
    3. Touchdown/Aquaplaning Protection (With Spin-up Override
    4. Locked Wheel Protection
    5. Gear Retract Braking
    6. Autobrake Command
    7. Pressure Control A pressure command will be generated from the above functions. The pressure command for brake control will be the lowest pressure resulting from comparing functions 1 through 4. Gear retract braking uses safeguards such as weight-on-wheels (Weight-On-Wheels) inputs, gear position handle, and gear down and locked switches. During autobrake control the command is the lowest of functions 6, 2, 3, and 4, along with all the safeguards of autobrake control.

The braking control unit will provide antiskid protection when the associated +28 VDC power supply is energized, the antiskid switch indicates antiskid on, and when the wheel speed is above 5.14 M/S (low speed dropout velocity). The software will measure the wheel speeds of all wheels from 123.5 M/S to zero through the axle mounted wheel speed tachometers. The wheel speed information will be used to determine incipient wheel skid conditions and a correction signal will be generated. This correction signal is the antiskid command. Antiskid control is performed on an individual wheel basis. Antiskid command is one of several inputs to the brake control function. Antiskid for the alternate channel is performed on a paired wheel basis.

The braking and steering control unit will perform closed loop pressure control on all twelve wheels of the normal and alternate systems (alternate system in analog control). The brake control unit will monitor the brake pressure transducers and use the pressure command and pressure feedback data to perform pressure control. An error signal is generated as follows:

PRESSURE ERROR=PRESSURE COMMAND−FEEDBACK PRESSURE

Through a modified PID (Proportional, Integral, Differential) control loop the software will generate a brake valve command to achieve the commanded pressure.

The metered pressure of brakes that are below the skid threshold will be controlled to within 1 bar between a tandem pair of brakes. The system will control brake pressure to each pair of brakes to ensure equal load, energy and wear sharing during taxi near the brake application threshold.

Figure 9:
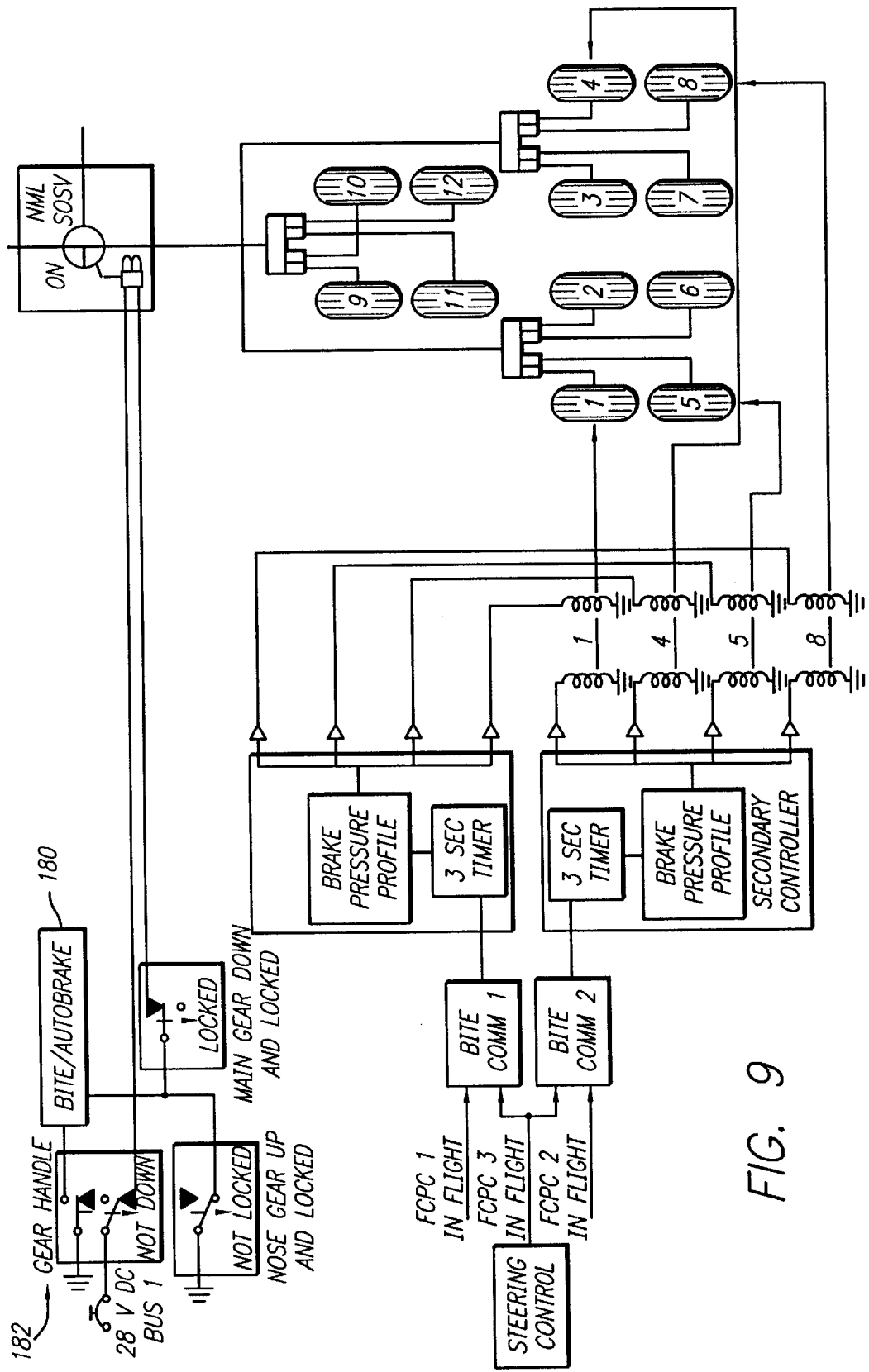
FIG. 9 is a schematic diagram of the gear retraction braking subsystem of the braking control system of FIG. 1.

Touchdown and aquaplaning protection is provided by comparing wheel speeds with the groundspeed signal from the Air Data Inertial Reference Units (ADIRUs). Any main gear aft wheel that is at a velocity 50 knots or more below the ADIRU groundspeed value is given a brake release signal. On the center gear, the left aft and right forward wheels are protected. The remaining main gear and center gear wheels are protected by the locked wheel protection feature. Touchdown and aquaplaning protection is inhibited once the groundspeed falls below 50 kts. The ADIRU signals are partitioned as shown in FIG. 9 so that redundant channels gets the same ADIRU.

In the event that an ADIRU channel falls to the high speed mode, the normal controllers using the Signal will release two of their associated brakes. If two ADIRU channels both fail to the high speed mode a maximum of four brakes will be released. In the event that an ADIRU channel is unavailable or falls to the low speed mode, aquaplaning and touchdown protection would be lost to wheels on the affected channels. The loss of one ADIRU would cause loss of direct protection to two wheels and loss of indirect protection to four wheels in a symmetrical fashion. This probability can be diminished by using the Weight-On-Wheels (WOW) sign in combination with a spin up override signal. Using this approach the system will inhibit pressure to the brakes for 3 seconds tuneable) after ground mode has been established or until the wheels have spun up, whichever occurs first.

Locked wheel protection will command zero pressure (system return pressure) to the brakes when a locked wheel condition is determined. Locked wheel protection compares the wheel speed of a wheel with that of its partner wheel. If the wheel speed of a wheel is 30% or less (tuneable) of its partner then a locked wheel condition is declared and zero pressure will be commanded to the locked brake. The factor of 30% has been chosen to allow for a flat tire running on the rim. Locked wheel crossover protection command is one of several inputs to the brake control function.

LOCKED WHEEL PAIRING: Fore-aft wheels are paired together as follows:

| Wheel 1 | pair | Wheel 5 |
| Wheel 2 | pair | Wheel 6 |
| Wheel 9 | pair | Wheel 11 |
| Wheel 10 | pair | Wheel 12 |
| Wheel 3 | pair | Wheel 7 |
| Wheel 4 | pair | Wheel 8 |

The brake control system will initiate gear retract braking when the landing gear lever is placed in the not down position after the weight-on-wheels signal has transitioned from ground mode to air mode and the main gear is not down and locked. A predetermined pressure will be applied to all brakes for three seconds or until the nose landing gear is no longer down and locked. The main gear down and locked input is included for additional safety and if deemed unnecessary may be removed.

The brake control card will receive the autobrake command from the BITE/Autobrake card. This command will be validated and used for autobrake control. The brake control card will monitor and evaluate autobraking engagement through the spoiler deployment indications, and the autobrake arming status. If the pedals are depressed beyond a predefined level at any time that autobrake is engaged/armed, the brake control card will disregard the autobrake command and assume normal antiskid braking effort.

The braking control unit will provide provisions for autobrake control with five different deceleration selection settings, and an RTO selection mode. The deceleration settings are tuneable and defined as:

Settings: OFF
  LO
  2
  3
  4
  HI and an RTO selection switch.

The following functions are performed in order to initiate autobrake control:

1. Autobrake Arming
2. Autobrake Deceleration Error Calculation
3. Autobrake Command Calculation
4. Autobrake Switch Panel Indication Control The proposed Autobrake control uses deceleration and ground speed received from the IRS (Inertial Reference System) via the ARINC 429 data bus. Data from the three independent ADIRU channels will be compared for validity and agreement in order to discard incorrect data.

The BITE/Autobrake card will read the setting of the autobrake switch and check the aircraft discretes for arming conditions. The following conditions will be met as a minimum for arming the Autobrake:

1. Autobrake switch at (LO, 2, 3, 4, HI, or RTO)
2. Primary hydraulic system pressurized
3. No external or Brake System failure that would prevent operation of normal braking on all braked wheels (TBC)
4. FCPC's available (at least 2)
5. ADIRU's available When all of the above minimum arming conditions have been satisfied, then the BSCU will provide the appropriate signals to the autobrake switch panel to latch the switch in position and transmit the discrete 'ARM'' bits in ARINC 429 form for each autobrake mode.

The BITE/Autobrake card will disarm the autobrake and remove the autobrake switch latching conditions (including the 'ARM' discrete to ARINC) when any of the following conditions are encountered:

1. The selected autobrake mode is deselected
2. Any arming condition is lost
3. The aircraft is in 'flight' for more than 10 Sec.
4. One or both brake pedals are depressed past a threshold (TBD) (for landing autobrake modes only)

In the above cases the braking control unit will control the rotary switch to the OFF position, or if in the RTO mode remove the 'ARM' caption on the display. In the case of item 2, the BSCU will transmit an "AUTOBRAKE FAULT" output on ARINC 429. In the case of items 1, 3, and 4 the BSCU will transmit an 'AUTOBRAKE OFF' output on ARINC 429.

When all of the arming conditions are satisfied the BSCU will initiate autobraking on the Normal Braking channel when the following conditions are met:

Landing mode:

Two out of three ground spoiler deployment Signals present, the Nose Landing Gear is on the ground (TBC) and a delay time has expired (TBD).

RTO mode:

Two out of three ground spoiler deployment signals present (no delay).

On engagement the BSCU will control the "ACTIVE" caption on the display. Pressure deployment will be smooth and controlled. A brake fill pressure spike will precede the autobrake pressure ramp-up to remove any unnecessary application delays and to remove unnecessary torque spikes of initial application When a new deceleration is selected the pressure change rate will be smooth and controlled in such a manner as to maximize passenger comfort.

Autobrake will disengage when any of the following conditions occur:

1. Any arming condition disappears
2. During operation two out of three ground spoiler signals are no longer present
3. During operation one or both brake pedals are depressed.

In the case of 1 disarming would operate as discussed above. In the case of 2 the 'ACTIVE' caption will disappear. In the case of 3 the BSCU will control the autobrake switch to the OFF position and the 'ARM' caption will disappear from the display panel. In the case of 2 and 3 the BSCU will transmit an 'AUTOBRAKE OFF' output on ARINC 429.

The braking and steering control unit autobrake will provide the highest degree of performance possible and will minimize the effects of the natural frequencies of the gear. The autobrake will control the overall deceleration of the aircraft. Other aircraft retarding effects such as use of the ground spoilers or thrust reversers will not affect the overall aircraft deceleration if the contributions from these factors are less than the selected deceleration value. During engagement and disengagement of the landing mode, including pedal brake take-over, pressure transitions will be smooth and less than 5 bars. Once the selected deceleration has been achieved, the average deceleration will not vary from the desired deceleration by more than 3%. Provided there is sufficient runway friction to obtain the desired deceleration, transient variations in deceleration will be less than ±10% of the reference deceleration for all aircraft speeds and configurations. Since the brake control algorithms are used for autobrake control, equal load sharing is guaranteed and temperature variations among brakes will be kept to a minimum.

Autobrake command calculation and update rate will be 20 milliseconds as a minimum. Data from the three ADIRU's are validated and used for the calculation of the autobrake command.

The BSCU BITE has been structured to use three independent cards. Two BIT/COMM cards (for Primary and Secondary channels) provide communication and local built in test for each channel. The BIT/COMM cards also provide the CMC, SPATIAL, and BSCU output ARINC 429 interfaces. A master BITE/Autobrake card provides fault isolation for the whole BSCU. The BITE/Autobrake card provides independent monitoring for the steering control card. The BITE/Autobrake card serves as a communication master and initiates all communication to the BIT/COMM cards. Each BIT/COMM card works with data from its associated three brake control cards. The BIT/COMM cards perform local fault isolation and transmits results to the BITE/Autobrake card. Each brake control and the steering control card performs it's own fault monitoring and transmits data to the BIT/COMM cards.

The brake control unit contains six brake control cards. Each BSCU brake control channel consists of three brake control cards. Primary and secondary brake control cards operate simultaneously to provide redundancy to the brake control function. The brake control card is designed to contain all the elements needed to control four wheels in the primary and alternate mode. The brake control card will use a high performance microprocessor. The following functions will be included as a minimum:

1. Pedal Interface
2. Pressure Transducer Interface
3. Wheelspeed Transducer Interface
4. Discrete Input Interface
5. Shutoff Valve Interface
6. Brake Control Valve Interface
7. External Velocity Interface
8. Asynchronous Serial Interface
9. Low Power Reset
10. Hardware Watchdog
11. Power Supply
12. Microprocessor related hardware (memory, I/O, latch, etc.)

The brake control card hardware will interface with four pedal potentiometers (Captain, First Officer, left and right pedals). The pedal interface will provide analog output to the brake control card analog inputs (A/D converter inputs). The brake control card hardware will interface with six pressure transducers (Normal, and Alternate). The pressure transducer interface hardware produces analog output linear to input pressure. The pressure transducer interface hardware output is multiplexed prior to input to the microcontroller analog input channels. The brake control card will provide the +15 VDC excitation to the pressure transducers. A test signal will be provided for each pressure transducer. This test signal is checked for out of tolerance limits and is multiplexed prior to input to the analog inputs.

The brake control card hardware will interface with four wheel speed transducers. The hardware will provide the appropriate wheel speed transducer oil bias current (typically 10 ma). The hardware will provide a hysteresis voltage in the detection circuitry to avoid noise triggering a wheel speed output. The hardware will convert the wheel speed interface sine wave signal to pulses proportional to wheel rotational velocity. These pulses are processed by the computer to derive wheel speed. A Schmitt Trigger interface is used to avoid false triggering.

The brake control unit will interface with various aircraft discretes The following list defines the minimum number of discrete input sources:

1. BSCU Pin Programming (if Needed)
2. Primary Hydraulic System Low Pressure
3. Secondary Hydraulic System Low Pressure
4. Landing Gear Selector Lever UP
5. Landing Gear Down and Locked
6. Flight/Ground switches
7. Autobrake Arming Demands (Autobrake Switch)
8. Antiskid and Nose Wheel Steering OFF Switch
9. Engine Master Lever Position
10. Fans On
11. SPATIAL Activation Each brake control card will be able to supply drive current to six valves (normal and alternate servo valves). Each valve driver will have capability to output 15 mA minimum per valve. The brake control card will have capability to detect open circuit/short circuit valve. The valve voltage is scaled and multiplexed into the analog to digital converter.

An independent current source (external to the brake control valve driver) will interface to the brake control valves. The additional current source provides means of fault isolation of the brake control valve driver interfaced. Additional initiated tests are performed such as resistive measurements of the wheel speed transducer utilizing both current sources. The external current source pulsing is through software control. This test is performed only when it is determined that is safe to do so, i.e. wheel speed=0 and velocity reference=0.

The brake control hardware will provide provisions for interfacing with the BIT/COMM cards. The serial link will provide high speed (TBD KBAUD) transmit and receive links to the BIT/COMM cards.

The brake control hardware will provide provisions for power-up and low power reset. Power up reset function holds the computer in reset condition until the power supplies have settled to the proper power levels (i.e. 5 volt digital, 5 volt analog reference). The reset time will be adjusted to achieve proper reset opera Low power reset is similar to power up reset. The low power reset circuitry will reset the computer when input power drops below the regulating limits of the 5 volts power supply.

Figure 11:
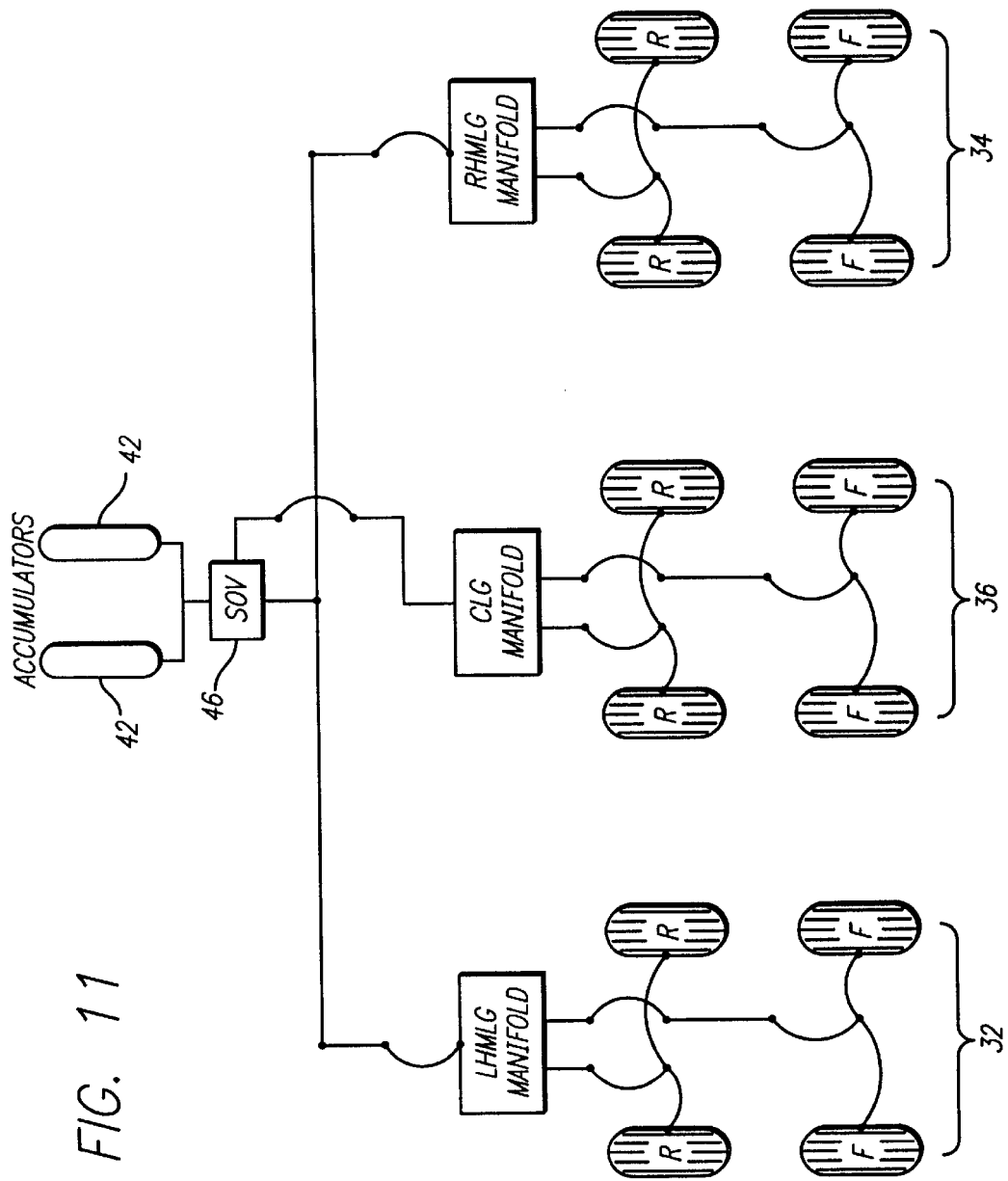
FIG. 11 is a schematic diagram of the emergency braking hydraulic fluid distribution scheme of the braking control system of FIG. 1.

The two hydraulic accumulators provide braking to the twelve wheels, as shown in the simplified schematic in FIG. 11, after 18 hours of flight, followed by seven brake applications to brake pressure of up to 100 bars. In this cast the Parking/Ultimate valve may leak at its maximum specified leakage rate of 6.0 cc/hr for the entire flight duration, which reduces the accumulator pressure to 201 bar, a remaining fluid volume of 7523 cm$^3$.

After the depletion phase described above, an initial brake application will consume 989 cm$^3$ followed by additional six brake applications from brake contact pressure of 21 bar to brake pressure of 100 bar. After the seventh brake application the accumulators pressure is 102 bar with a remaining hydraulic fluid volume of 4721 cm$^3$.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. In combination with an aircraft, an apparatus for dual redundant control of hydraulically operated wheel braking for the aircraft, the aircraft having right and left main landing gear and center landing gear that can move between a retracted position and an actuated position, the landing gear having a plurality of wheels and a corresponding plurality of wheel brakes for the plurality of wheels, and a plurality of brake pedals for controlling operation of braking of said plurality of said wheels, said apparatus comprising:

a primary hydraulic system connected in fluid communication with said plurality of wheel brakes for providing hydraulic power for normal operation of said plurality of wheel brakes in a normal braking mode, said primary hydraulic system comprising a plurality of primary hydraulic fluid control channels and a corresponding plurality of secondary hydraulic fluid control channels, the primary and secondary hydraulic fluid control channels operating simultaneously and autonomously, and being redundant and partitioned among said plurality of wheel brakes so that even if one of the plurality of primary hydraulic fluid- control channels and a corresponding one of the plurality of secondary hydraulic fluid control channels fail to apply pressure, braking will be lost to only a portion of the wheel brakes and the loss will be in a symmetrical pattern;

a secondary hydraulic system connected in fluid communication with said plurality of wheel brakes for providing hydraulic power for operation of said plurality of wheel brakes in an alternate braking mode, said secondary hydraulic system providing dual redundant analog brake-by-wire control in the alternate braking mode for the right and left main and center landing gears of the aircraft, and said secondary hydraulic system comprising at least one primary hydraulic fluid control channel and at least one secondary hydraulic fluid control channel;

a control unit for controlling brake pressure communicated to said wheel brakes through said primary and secondary hydraulic systems; and a monitor channel operatively connected to said primary and secondary hydraulic systems for detecting faults in said primary and secondary hydraulic systems and for selecting between the primary and secondary hydraulic systems for providing braking pressure.

2. The apparatus of claim 1, wherein said plurality of wheel brakes comprises a front pair of wheel brakes and an aft pair of wheel brakes for each of said right and left main landing gear, and wherein wheel braking power is provided by main landing gear common fluid channels to adjacent ones of said front and aft wheel brakes to provide protection against asymmetrical wheel braking.

3. The apparatus of claim 1, wherein said plurality of brake pedals comprises a plurality of left brake pedals and a plurality of right brake pedals for controlling braking, and wherein said plurality of wheel brakes comprises a front pair of wheel brakes and an aft pair of wheel brakes, and wherein said primary and secondary hydraulic fluid control channels control all four wheels of the center landing gear.

4. The apparatus of claim 3, wherein wheel braking power is provided by center landing gear common fluid channels to the wheel brakes of the center landing gear on an axle pair basis.

5. The apparatus of claim 1, wherein said plurality of wheel brakes are symmetrically divided into three sets of wheel brakes, and wherein said primary hydraulic system comprises first, second and third redundant pairs of primary and secondary fluid control channels, said first redundant pair of primary and secondary fluid control channels including a first primary hydraulic fluid control channel and a first secondary hydraulic fluid control channel, each of said first primary and said first secondary hydraulic fluid control channels controlling said first set of wheel brakes, said second redundant pair of primary and secondary fluid control channels including a second primary hydraulic fluid control channel and a second secondary hydraulic fluid control channel, each of said second primary and said second secondary hydraulic fluid control channels controlling said second set of wheel brakes, said third redundant pair of primary and secondary fluid control channels including a third primary hydraulic fluid control channel and a third secondary hydraulic fluid control channel, each of said third primary and said third secondary hydraulic fluid control channels controlling said third set of wheel brakes.

6. The apparatus of claim 5, wherein each said pair of primary and secondary hydraulic fluid control channels controls each of said right and left main landing gear and center landing gear.

7. The apparatus of claim 1, wherein said secondary hydraulic system provides pressure for alternate braking using dual, independent, closed loop analog control circuits.

8. The apparatus of claim 1, wherein said secondary hydraulic system comprises a plurality of accumulators for providing an alternate supply of hydraulic power.

9. The apparatus of claim 8, wherein said alternate supply of hydraulic power is provided for an emergency braking mode in the event that both the primary hydraulic system and the secondary hydraulic system are depressurized.

10. The apparatus of claim 8, wherein said alternate supply of hydraulic power is provided for an ultimate braking mode providing braking pressure to said plurality of wheel brakes.

11. The apparatus of claim 8, wherein said alternate supply of hydraulic power is provided for a parking brake mode providing braking pressure to said plurality of wheel brakes.

12. The apparatus of claim 1, wherein said monitor channel detects occurrence of loss of pressure in the primary hydraulic system, if any brake has unwanted pressure applied, and if a fault is detected on the primary or secondary hydraulic systems that affects more than one wheel brake on each landing gear.

13. The apparatus of claim 1, further comprising first and second solenoid operated shut-off valves operatively connected to said primary and secondary hydraulic systems, respectively, and to said control unit for selecting operation of one of said primary and secondary hydraulic systems, said first and second solenoid operated shut-off valves being configured to operate in a mutually exclusive manner to positively select between operation of said primary and secondary hydraulic systems without the possibility of having both systems pressurized at the same time.

14. The apparatus of claim 13, wherein said control unit comprises thrust levers, and said solenoid operated shut-off valves are implemented through said thrust levers to positively prevent pressure from the primary hydraulic system and secondary hydraulic system being applied to the primary or secondary hydraulic systems during take off.

15. In combination with an aircraft, an apparatus for dual redundant control of hydraulically operated wheel braking for the aircraft, the aircraft having right and left main landing gear and center landing gear that can move between a retracted position and an actuated position, the landing gear having a plurality of wheels and a corresponding plurality of wheel brakes- for the plurality of wheels, and a plurality of brake pedals for controlling operation of braking of said plurality of said wheels, said apparatus comprising:

a primary hydraulic system connected in fluid communication with said plurality of wheel brakes in a normal braking mode, said primary hydraulic system comprising a plurality of primary hydraulic fluid control channels and a plurality of secondary hydraulic fluid control channels, the primary and secondary hydraulic fluid control channels operating simultaneously and autonomously, and being redundant and partitioned among said plurality of wheel brakes so that even if both the primary and secondary hydraulic fluid control channels fail to apply pressure, braking will be lost to only a portion of the wheel brakes and the loss will be in a symmetrical pattern;

a secondary hydraulic system connected in fluid communication with said plurality of wheel brakes for providing hydraulic power for operation of said plurality of wheel brakes in an alternate braking mode, said secondary hydraulic system providing dual redundant analog brake-by-wire control in the alternate braking mode for the right and left main and center landing gears of the aircraft, and said secondary hydraulic system comprising at least one primary hydraulic fluid control channel and at least one secondary hydraulic fluid control channel;

a control unit for controlling brake pressure communicated to said wheel brakes through said primary and secondary hydraulic systems;

a monitor channel operatively connected to said primary and secondary hydraulic systems for detecting faults in said primary and secondary hydraulic systems and for selecting between the primary and secondary hydraulic systems for providing braking pressure;

first and second solenoid operated shut-off valves operatively connected to said primary and secondary hydraulic systems, respectively, and to said control unit for selecting operation of one of said primary and secondary hydraulic systems, said first and second solenoid operated shut-off valves being configured to operate in a mutually exclusive manner to positively select between operation of said primary and secondary hydraulic systems without the possibility of having both systems pressurized at the same time, wherein said control unit comprises thrust levers, and said solenoid operated shut-off valves are implemented through said thrust levers to positively prevent pressure from the primary hydraulic system and secondary hydraulic system being applied to the primary or secondary hydraulic systems during take off; and a landing gear lever controlling retraction of the landing gear, and dual redundant switches on the landing gear lever to bypass the thrust lever switches to stop the wheels during climb when the thrust levers are advanced to enable wheel braking upon retraction of the landing gear.

16. The apparatus of claim 15, wherein the center landing gear comprises a nose landing gear, and each of the primary brake hydraulic fluid control channels receives a software independent signal that initiates retraction braking for three seconds or until the nose landing gear is up and locked, whichever happens sooner.

17. The apparatus of claim 15, wherein an anti-skid function of the normal braking mode is inhibited during retraction braking.

18. The apparatus of claim 14, wherein said control unit comprises a plurality of servo control valves controlled by corresponding dual solenoid coils for controlling the operation of said wheel brakes, respectively, and wherein said thrust levers comprise dual thrust lever switches that break both power and ground to said first and second solenoid operated shut-off valves for the primary hydraulic system and secondary hydraulic systems when one of said thrust levers is advanced.

19. The apparatus of claim 14, wherein said control unit further comprises a plurality of sensors for sensing the position of each said brake pedal.

20. In combination with an aircraft, an apparatus for dual redundant control of hydraulically operated wheel braking for the aircraft, the aircraft having right and left main landing gear and center landing gear that can move between a retracted position and an actuated position, the landing gear having a plurality of wheels and a corresponding plurality of wheel brakes for the plurality of wheels, and a plurality of brake pedals for controlling operation of braking of said plurality of said wheels, said apparatus comprising:

a primary hydraulic system connected in fluid communication with said plurality of wheel brakes for providing hydraulic power for normal operation of said plurality of wheel brakes in a normal braking mode, said primary hydraulic system comprising a plurality of primary hydraulic fluid control channels and a plurality of secondary hydraulic fluid control channels, the primary-and secondary hydraulic fluid control channels operating simultaneously and autonomously, and being redundant and partitioned among said plurality of wheel brakes so that even if both the primary and secondary hydraulic fluid control channels fail to apply pressure, braking will be lost to only a portion of the wheel brakes and the loss will be in a symmetrical pattern;

a secondary hydraulic system connected in fluid communication with said plurality of wheel brakes for providing hydraulic power for operation of said plurality of wheel brakes in an alternate braking mode, said secondary hydraulic system providing dual redundant analog brake-by-wire control in the alternate braking mode for the right and left main and center landing gears of the aircraft, and said secondary hydraulic system comprising at least one primary hydraulic fluid control channel and at least one secondary hydraulic fluid control channel;

a control unit for controlling brake pressure communicated to said wheel brakes through said primary and secondary hydraulic systems;

a monitor channel operatively connected to said primary and secondary hydraulic systems for detecting faults in said primary and secondary hydraulic systems and for selecting between the primary and secondary hydraulic systems for providing braking pressure;

first and second solenoid operated shut-off valves operatively connected to said primary and secondary hydraulic systems, respectively, and to said control unit for selecting operation of one of said primary and secondary hydraulic systems, said first and second solenoid operated shut-off valves being configured to operate in a mutually exclusive manner to positively select between operation of said primary and secondary hydraulic systems without the possibility of having both systems pressurized at the same time, wherein said control unit comprises thrust levers, and said solenoid operated shut-off valves are implemented through said thrust levers to positively prevent pressure from the primary hydraulic system and secondary hydraulic system being applied to the primary or secondary hydraulic systems during take off;

wherein said control unit further comprises a plurality of sensors for sensing the position of each said brake pedal, and wherein said plurality of sensors comprises dual redundant switches that break both power and ground to said first and second solenoid operated shut-off valves, such that depression of one of said brake pedals opens the first and second solenoid operated shut-off valve for one of the primary hydraulic system in the normal braking mode and the secondary hydraulic system in the alternate braking mode.

21. In combination with an aircraft, an apparatus for dual redundant control of hydraulically operated wheel braking for the aircraft, the aircraft having right and left main landing gear and center landing gear that can move between a retracted position and an actuated position, the landing gear having a plurality of wheels and a corresponding plurality of wheel brakes for the plurality of wheels, and a plurality of brake pedals for controlling operation of braking of said plurality of said wheels, said apparatus comprising:

a primary hydraulic system connected in fluid communication with said plurality of wheel brakes for providing hydraulic power for normal operation of said plurality of wheel brakes in a normal braking mode, said primary hydraulic system comprising a plurality of primary hydraulic fluid control channels and a plurality of secondary hydraulic fluid control channels, the primary and secondary hydraulic fluid control channels operating simultaneously and autonomously, and being redundant and partitioned among said plurality of wheel brakes so that even if both the primary and secondary hydraulic fluid control channels fail to apply pressure, braking will be lost to only a portion of the wheel brakes and the loss will be in a symmetrical pattern;

a secondary hydraulic system connected in fluid communication with said plurality of wheel brakes for providing hydraulic power for operation of said plurality of wheel brakes in an alternate braking mode, said secondary hydraulic system providing dual redundant analog brake-by-wire control in the alternate braking mode for the right and left main and center landing gears of the aircraft, and said secondary hydraulic system comprising at least one primary hydraulic fluid control channel and at least one secondary hydraulic fluid control channel;

a control unit for controlling brake pressure communicated to said wheel brakes through said primary and secondary hydraulic systems;

a monitor channel operatively connected to said primary and secondary hydraulic systems for detecting faults in said primary and secondary hydraulic systems and for selecting between the primary and secondary hydraulic systems for providing braking pressure; and first and second solenoid operated shut-off valves operatively connected to said primary and secondary hydraulic systems, respectively, and to said control unit for selecting operation of one of said primary and secondary hydraulic systems, said first and second solenoid operated shut-off valves being configured to operate in a mutually exclusive manner to positively select between operation of said primary and secondary hydraulic systems without the possibility of having both systems pressurized at the same time, wherein said control unit comprises thrust levers, and said solenoid operated shut-off valves are implemented through said thrust levers to positively prevent pressure from the primary hydraulic system and secondary hydraulic system being applied to the primary or secondary hydraulic systems during take off;

wherein said first and second solenoid operated shut-off valves also turn off hydraulic power to said servo control valves during flight.

22. The apparatus of claim 14, wherein said first and second solenoid operated shut-off valves comprise three way solenoid operated shut-off valves.

23. The apparatus of claim 14, wherein said control unit further comprises sensor means for determining brake pedal application and for generating a pedal application signal indicating when one of said brake pedals has been applied.

24. In combination with an aircraft, an apparatus for dual redundant control of hydraulically operated wheel braking for the aircraft, the aircraft having right and left main landing gear and center landing gear that can move between a retracted position and an actuated position, the landing gear having a plurality of wheels and a corresponding plurality of wheel brakes for the plurality of wheels, and a plurality of brake pedals for controlling operation of braking of said plurality of said wheels, said apparatus comprising:

a primary hydraulic system connected in fluid communication with said plurality of wheel brakes for providing hydraulic power for normal operation of said plurality of wheel brakes in a normal braking mode, said primary hydraulic system comprising a plurality of primary hydraulic fluid control channels and a plurality of secondary hydraulic fluid control channels, the primary and secondary hydraulic fluid control channels operating simultaneously and autonomously, and being redundant and partitioned among said plurality of wheel brakes so that even if both the primary and secondary hydraulic fluid control channels fail to apply pressure, braking will be lost to only a portion of the wheel brakes and the loss will be in a symmetrical pattern;

a secondary hydraulic system connected in fluid communication with said plurality of wheel brakes for providing hydraulic power for operation of said plurality of wheel brakes in an alternate braking mode, said secondary hydraulic system providing dual redundant analog brake-by-wire control in the alternate braking mode for the right and left main and center landing gears of the aircraft, and said secondary hydraulic system comprising at least one primary hydraulic fluid control channel and at least one secondary hydraulic fluid control channel;

a control unit for controlling brake pressure communicated to said wheel brakes through said primary and secondary hydraulic systems;

a monitor channel operatively connected to said primary and secondary hydraulic systems for detecting faults in said primary and secondary hydraulic systems and for selecting between the primary and secondary hydraulic systems for providing braking pressure; and first and second solenoid operated shut-off valves operatively connected to said primary and secondary hydraulic systems, respectively, and to said control unit for selecting operation of one of said primary and secondary hydraulic systems, said first and second solenoid operated shut-off valves being configured to operate in a mutually exclusive manner to positively select between operation of said primary and secondary hydraulic systems without the possibility of having both systems pressurized at the same time, wherein said control unit comprises thrust levers, and said solenoid operated shut-off valves are implemented through said thrust levers to positively prevent pressure from the primary hydraulic system and secondary hydraulic system being applied to the primary or secondary hydraulic systems during take off;

wherein said control unit further comprises means for sensing weight on said plurality of wheels and for generating a brake inhibit signal when weight is not applied on said plurality of wheels.

25. The apparatus of claim 1, wherein said control unit further comprises a plurality of servo control valves for controlling the operation of said wheel brakes.

26. The apparatus of claim 25, wherein said plurality of servo control valves are controlled by corresponding dual solenoid coils.

27. The apparatus of claim 25, wherein said plurality of servo control valves are further controlled with pressure feedback.

28. The apparatus of claim 25, wherein said plurality of servo control valves comprises twelve dual coil brake control valves in the primary hydraulic fluid system.

29. The apparatus of claim 27, further comprising antiskid control provided on each of said plurality of wheel brakes utilizing the servo control valves with pressure feedback.

30. The apparatus of claim 1, wherein said control unit comprises system six brake control cards providing dual redundant digital brake-by-wire controls.

31. The apparatus of claim 1, wherein said control unit comprises a built-in-test equipment card for said primary hydraulic fluid system providing mutually exclusive hydraulic system selection.

32. The apparatus of claim 25, wherein said control unit comprises a pressure sensor mounted downstream of each servo control valve for detecting asymmetrical braking due to unwanted pressure applied to any of said plurality of wheel brakes, whereby the monitor channel can select the alternate hydraulic fluid system.

33. The apparatus of claim 1, further comprising an autobrake control subsystem.

34. The apparatus of claim 3, wherein said plurality of brake pedals comprises a plurality of left brake pedals and a plurality of right brake pedals, and said primary and secondary hydraulic fluid control channels are connected to said front and aft pairs of wheel brakes such that the left brake pedals control the front pair and the right brake pedals control the aft pair.

35. The apparatus of claim 9, wherein said plurality of wheel brakes comprises center landing gear and main landing gear wheel brakes, and in the emergency braking mode said plurality of accumulators provides hydraulic power to said center landing gear and main landing gear wheel brakes.

36. In combination with an aircraft, an apparatus for dual redundant control of hydraulically operated wheel braking for the aircraft, the aircraft having landing gear that can move between a retracted position and an actuated position, the landing gear having a plurality of wheels and a corresponding plurality of wheel brakes for the plurality of wheels, wherein said plurality of wheel brakes are symmetrically divided into three sets of wheel brakes, and a plurality of brake pedals for controlling operation of braking of said plurality of said wheels, said apparatus comprising:

a primary hydraulic system connected in fluid communication with said plurality of wheel brakes for providing hydraulic power for normal operation of said plurality of wheel brakes in a normal braking mode, said primary hydraulic system comprising a plurality of primary hydraulic fluid control channels and a plurality of secondary hydraulic fluid control channels, the primary and secondary hydraulic fluid control channels operating simultaneously and autonomously, and wherein said primary hydraulic system comprises first, second and third redundant pairs of primary and secondary fluid control channels, said first redundant pair of primary and secondary fluid control channels including a first primary hydraulic fluid control channel and a first secondary hydraulic fluid control channel, each of said first primary and said first secondary hydraulic fluid control channels controlling said first set of wheel brakes, said second redundant pair of primary and secondary fluid control channels including a second primary hydraulic fluid control channel and a second secondary hydraulic fluid control channel, each of said second primary and said second secondary hydraulic fluid control channels controlling said second set of wheel brakes, said third redundant pair of primary and secondary fluid control channels including a third primary hydraulic fluid control channel and a third secondary hydraulic fluid control channel, each of said third primary and said third secondary hydraulic fluid control channels controlling said third set of wheel brakes;

a secondary hydraulic system connected in fluid communication with said plurality of wheel brakes for providing hydraulic power for operation of said plurality of wheel brakes in an alternate braking mode, said secondary hydraulic system comprising at least one primary hydraulic fluid control channel and at least one secondary hydraulic fluid control channel;

a control unit for controlling brake pressure communicated to said wheel brakes through said primary and secondary hydraulic systems;

a monitor channel operatively connected to said primary and secondary hydraulic systems for detecting faults in said primary and secondary hydraulic systems and for selecting between the primary and secondary hydraulic systems for providing braking pressure; and first and second solenoid operated shut-off valves operatively connected to said primary and secondary hydraulic systems, respectively, and to said control unit for selecting operation of one of said primary and secondary hydraulic systems, said first and second solenoid operated shut-off valves being configured to operate in a mutually exclusive manner to positively select between operation of said primary and secondary hydraulic systems without the possibility of having both systems pressurized at the same time, wherein said control unit comprises thrust levers, and said solenoid operated shut- off valves are implemented through said thrust levers to positively prevent pressure from the primary hydraulic system and secondary hydraulic system being applied to the primary or secondary hydraulic systems during take off.

37. In combination with an aircraft, an apparatus for dual redundant control of hydraulically operated wheel braking for the aircraft, the aircraft having landing gear that can move between a retracted position and an actuated position, the landing gear having a plurality of wheels and a corresponding plurality of wheel brakes for the plurality of wheels, wherein said plurality of wheel brakes are symmetrically divided into three sets of wheel brakes, and a plurality of brake pedals for controlling operation of braking of said plurality of said wheels, said apparatus comprising:

a primary hydraulic system connected in fluid communication with said plurality of wheel brakes for providing hydraulic power for normal operation of said plurality of wheel brakes in a normal braking mode, said primary hydraulic system comprising at least one primary hydraulic fluid control channel and at least one secondary hydraulic fluid control channel, the primary and secondary hydraulic fluid control channels operating simultaneously and autonomously, and wherein said primary hydraulic system comprises first, second and third redundant pairs of primary and secondary fluid control channels, said first redundant pair of primary and secondary fluid control channels including a first primary hydraulic fluid control channel and a first secondary hydraulic fluid control channel, each of said first primary and said first secondary hydraulic fluid control channels controlling said first set of wheel brakes, said second redundant pair of primary and secondary fluid control channels including a second primary hydraulic fluid control channel and a second secondary hydraulic fluid control channel, each of said second primary and said second secondary hydraulic fluid control channels controlling said second set of wheel brakes, said third redundant pair of primary and secondary fluid control channels including a third primary hydraulic fluid control channel and a third secondary hydraulic fluid control channel, each of said third primary and said third secondary hydraulic fluid control channels controlling said third set of wheel brakes;

a secondary hydraulic system connected in fluid communication with said plurality of wheel brakes for providing hydraulic power for operation of said plurality of wheel brakes in an alternate braking mode, said secondary hydraulic system comprising at least one primary hydraulic fluid control channel and at least one secondary hydraulic fluid control channel;

a control unit for controlling brake pressure communicated to said wheel brakes through said primary and secondary hydraulic systems;

a monitor channel operatively connected to said primary and secondary hydraulic systems for detecting faults in said primary and secondary hydraulic systems and for selecting between the primary and secondary hydraulic systems for providing braking pressure;

first and second solenoid operated shut-off valves operatively connected to said primary and secondary hydraulic systems, respectively, and to said control unit for selecting operation of one of said primary and secondary hydraulic systems, said first and second solenoid operated shut-off valves being configured to operate in a mutually exclusive manner to positively select between operation of said primary and secondary hydraulic systems without the possibility of having both systems pressurized at the same time, wherein said control unit comprises thrust levers, and said solenoid operated shut-off valves are implemented through said thrust levers to positively prevent pressure from the primary hydraulic system and secondary hydraulic system being applied to the primary or secondary hydraulic systems during take off; and a landing gear lever controlling retraction of the landing gear, and dual redundant switches on the landing gear lever to bypass the thrust lever switches to stop the wheels during climb when the thrust levers are advanced to enable wheel braking upon retraction of the landing gear.

38. The apparatus of claim 37, wherein the center landing gear comprises a nose landing gear, and each of the primary brake hydraulic fluid control channels receives a software independent signal that initiates retraction braking for three seconds or until the nose landing gear is up and locked, whichever happens sooner.

39. The apparatus of claim 37, wherein an anti-skid function of the normal braking mode is inhibited during retraction braking.

40. The apparatus of claim 36, wherein said control unit comprises a plurality of servo control valves controlled by corresponding dual solenoid coils for controlling the operation of said wheel brakes, respectively, and wherein said thrust levers comprise dual thrust lever switches that break both power and ground to said first and second solenoid operated shut-off valves for the primary hydraulic system and secondary hydraulic systems when one of said thrust levers is advanced.

41. The apparatus of claim 38, wherein said control unit further comprises a plurality of sensors for sensing the position of each said brake pedal.

42. The apparatus of claim 41, wherein said plurality of sensors comprises dual redundant switches that break both power and ground to said first and second solenoid operated shut-off valves, such that depression of one of said brake pedals opens the first and second solenoid operated shut-off valve for one of the primary hydraulic system in the normal braking mode and the secondary hydraulic system in the alternate braking mode.

43. In combination with an aircraft, an apparatus for dual redundant control of hydraulically operated wheel braking for the aircraft, the aircraft having landing gear that can move between a retracted position and an actuated position, the landing gear having a plurality of wheels and a corresponding plurality of wheel brakes for the plurality of wheels, wherein said plurality of wheel brakes are symmetrically divided into three sets of wheel brakes, and a plurality of brake pedals for controlling operation of braking of said plurality of said wheels, said apparatus comprising:

a primary hydraulic system connected in fluid communication with said plurality of wheel brakes for providing hydraulic power for normal operation of said plurality of wheel brakes in a normal braking mode, said primary hydraulic system comprising at least one primary hydraulic fluid control channel and at least one secondary hydraulic fluid control channel, the primary and secondary hydraulic fluid control channels operating simultaneously and autonomously, and wherein said primary hydraulic system comprises first, second and third redundant pairs of primary and secondary fluid control channels, said first redundant pair of primary and secondary fluid control channels including a first primary hydraulic fluid control channel and a first secondary hydraulic fluid control channel, each of said first primary and said first secondary hydraulic fluid control channels controlling said first set of wheel brakes, said second redundant pair of primary and secondary fluid control channels including a second primary hydraulic fluid control channel and a second secondary hydraulic fluid control channel, each of said second primary and said second secondary hydraulic fluid control channels controlling said second set of wheel brakes, said third redundant pair of primary and secondary fluid control channels including a third primary hydraulic fluid control channel and a third secondary hydraulic fluid control channel, each of said third primary and said third secondary hydraulic fluid control channels controlling said third set of wheel brakes;

a secondary hydraulic system connected in fluid communication with said plurality of wheel brakes for providing hydraulic power for operation of said plurality of wheel brakes in an alternate braking mode, said secondary hydraulic system comprising at least one primary hydraulic fluid control channel and at least one secondary hydraulic fluid control channel;

a control unit for controlling brake pressure communicated to said wheel brakes through said primary and secondary hydraulic systems;

a monitor channel operatively connected to said primary and secondary hydraulic systems for detecting faults in said primary and secondary hydraulic systems and for selecting between the primary and secondary hydraulic systems for providing braking pressure; and first and second solenoid operated shut-off valves operatively connected to said primary and secondary hydraulic systems, respectively, and to said control unit for selecting operation of one of said primary and secondary hydraulic systems, said first and second solenoid operated shut-off valves being configured to operate in a mutually exclusive manner to positively select between operation of said primary and secondary hydraulic systems without the possibility of having both systems pressurized at the same time, wherein said control unit comprises thrust levers, and said solenoid operated shut- off valves are implemented through said thrust levers to positively prevent pressure from the primary hydraulic system and secondary hydraulic system being applied to the primary or secondary hydraulic systems during take off;

wherein said first and second solenoid operated shut-off valves also turn off hydraulic power to said servo control valves during flight.

44. The apparatus of claim 36, wherein said first and second solenoid operated shut-off valves comprise three way solenoid operated shut-off valves.

45. The apparatus of claim 36, wherein said control unit further comprises sensor means for determining brake pedal application and for generating a pedal application signal indicating when one of said brake pedals has been applied.

46. In combination with an aircraft, an apparatus for dual redundant control of hydraulically operated wheel braking for the aircraft, the aircraft having landing gear that can move between a retracted position and an actuated position, the landing gear having a plurality of wheels and a corresponding plurality of wheel brakes for the plurality of wheels, wherein said plurality of wheel brakes are symmetrically divided into three sets of wheel brakes, and a plurality of brake pedals for controlling operation of braking of said plurality of said wheels, said apparatus comprising:

a primary hydraulic system connected in fluid communication with said plurality of wheel brakes for providing hydraulic power for normal operation of said plurality of wheel brakes in a normal braking mode, said primary hydraulic system comprising at least one primary hydraulic fluid control channel and at least one secondary hydraulic fluid control channel, the primary and secondary hydraulic fluid control channels operating simultaneously and autonomously, and wherein said primary hydraulic system comprises first, second and third redundant pairs of primary and secondary fluid control channels, said first redundant pair of primary and secondary fluid control channels including a first primary hydraulic fluid control channel and a first secondary hydraulic fluid control channel, each of said first primary and said first secondary hydraulic fluid control channels controlling said first set of wheel brakes, said second redundant pair of primary and secondary fluid control channels including a second primary hydraulic fluid control channel and a second secondary hydraulic fluid control channel, each of said second primary and said second secondary hydraulic fluid control channels controlling said second set of wheel brakes, said third redundant pair of primary and secondary fluid control channels including a third primary hydraulic fluid control channel and a third secondary hydraulic fluid control channel, each of said third primary and said third secondary hydraulic fluid control channels controlling said third set of wheel brakes;

a secondary hydraulic system connected in fluid communication with said plurality of wheel brakes for providing hydraulic power for operation of said plurality of wheel brakes in an alternate braking mode, said secondary hydraulic system comprising at least one primary hydraulic fluid control channel and at least one secondary hydraulic fluid control channel;

a control unit for controlling brake pressure communicated to said wheel brakes through said primary and secondary hydraulic systems;

a monitor channel operatively connected to said primary and secondary hydraulic systems for detecting faults in said primary and secondary hydraulic systems and for selecting between the primary and secondary hydraulic systems for providing braking pressure;

first and second solenoid operated shut-off valves operatively connected to said primary and secondary hydraulic systems, respectively, and to said control unit for selecting operation of one of said primary and secondary hydraulic systems, said first and second solenoid operated shut-off valves being configured to operate in a mutually exclusive manner to positively select between operation of said primary and secondary hydraulic systems without the possibility of having both systems pressurized at the same time, wherein said control unit comprises thrust levers, and said solenoid operated shut-off valves are implemented through said thrust levers to positively prevent pressure from the primary hydraulic system and secondary hydraulic system being applied to the primary or secondary hydraulic systems during take off, and wherein said control unit further comprises means for sensing weight on said plurality of wheels and for generating a brake inhibit signal when weight is not applied on said plurality of wheels.

47. In combination with aircraft landing gear, an apparatus for redundant control of hydraulically operated wheel braking for the aircraft landing gear moving between a retracted position and an actuated position, the landing gear having a plurality of wheels and a corresponding plurality of wheel brakes for the plurality of wheels, wherein said plurality of wheel brakes are symmetrically divided into three sets of wheel brakes, and a plurality of brake pedals for controlling operation of braking of said plurality of said wheels, said apparatus comprising:

a primary hydraulic system connected in fluid communication with said plurality of wheel brakes for providing hydraulic power for normal operation of said plurality of wheel brakes in a normal braking mode, said primary hydraulic system including a plurality of primary hydraulic fluid control channels and a corresponding plurality of secondary hydraulic fluid control channels, said plurality of secondary hydraulic fluid control channels operating simultaneously with and independently from said plurality of primary hydraulic fluid control channels, and wherein said primary hydraulic system comprises first, second and third redundant pairs of primary and secondary fluid control channels, said first redundant pair of primary and secondary fluid control channels including a first primary hydraulic fluid control channel and a first secondary hydraulic fluid control channel, each of said first primary and said first secondary hydraulic fluid control channels controlling said first set of wheel brakes, said second redundant pair of primary and secondary fluid control channels including a second primary hydraulic fluid control channel and a second secondary hydraulic fluid control channel, each of said second primary and said second secondary hydraulic fluid control channels controlling said second set of wheel brakes, said third redundant pair of primary and secondary fluid control channels including a third primary hydraulic fluid control channel and a third secondary hydraulic fluid control channel, each of said third primary and said third secondary hydraulic fluid control channels controlling said third set of wheel brakes;

a secondary hydraulic system connected in fluid communication with said plurality of wheel brakes for providing hydraulic power for operation of said plurality of wheel brakes in an alternate braking mode;

a control unit for controlling brake pressure communicated to said wheel brakes through said primary and secondary hydraulic systems; and a monitor channel operatively connected to said primary hydraulic system for detecting faults in said primary and secondary hydraulic systems and for selecting between the primary and secondary hydraulic systems for providing braking pressure.

48. The apparatus of claim 47, wherein said primary and secondary fluid control channels are partitioned among said plurality of sets of said plurality of wheel brakes so that even if both the primary and secondary channels for one of said sets of said plurality of wheel brakes fail to apply pressure, braking will be lost to only a portion of the wheel brakes and the loss will be in a symmetrical pattern, and said secondary hydraulic system comprises a plurality of primary hydraulic fluid control channels and a plurality of secondary hydraulic fluid control channels.

49. The apparatus of claim 48, wherein said plurality of wheels of said landing gear comprises right and left main landing gear, each including a front pair of wheel brakes and an aft pair of wheel brakes, and wherein wheel braking power is provided by common fluid channels to adjacent ones of said front and aft wheel brakes to provide protection against asymmetrical wheel braking.

50. The apparatus of claim 48, further comprising a plurality of left brake pedals and a plurality of right brake pedals for controlling braking, and wherein said plurality of wheels of said landing gear further comprises a center landing gear including a front pair of wheel brakes and an aft pair of wheel brakes, and wherein said primary and secondary fluid control channels control all four wheels of the center landing gear.

51. The apparatus of claim 50, wherein wheel braking power is provided by common fluid channels to the wheel brakes of the center landing gear on an axle pair basis.

52. The apparatus of claim 48 wherein said plurality of primary hydraulic fluid control channels comprises three primary hydraulic fluid control channels, and said plurality of secondary hydraulic fluid control channels comprises three secondary hydraulic fluid control channels.

53. The apparatus of claim 48, wherein each pair of primary and secondary fluid control channels controls the same four wheels.

54. The apparatus of claim 48, wherein said secondary hydraulic system provides pressure for alternate braking using dual, independent, closed loop analog control circuits.

55. The apparatus of claim 48, wherein said plurality of wheels of said landing gear comprises right and left main landing gear and a center landing gear, and wherein said secondary hydraulic system provides dual redundant analog brake-by-wire control in the alternate braking mode for the main and center landing gears of the aircraft.

56. The apparatus of claim 47, wherein said secondary hydraulic system comprises a plurality of accumulators for providing an alternate supply of hydraulic power for an emergency braking mode in the event that both the primary hydraulic system and the secondary hydraulic system are depressurized.

57. The apparatus of claim 56, wherein said alternate supply of hydraulic power is provided for an ultimate braking mode providing braking pressure to a plurality of said wheel brakes.

58. The apparatus of claim 56, wherein said alternate supply of hydraulic power is provided for a parking brake mode providing braking pressure to a plurality of said wheel brakes.

59. The apparatus of claim wherein said monitor channel detects occurrence of loss of pressure in the primary hydraulic system, if any brake has unwanted pressure applied, and if a fault is detected on primary or secondary channels of the primary hydraulic system that affects more than one wheel brake on each landing gear.

60. The apparatus of claim 47, further comprising first and second solenoid operated shut-off valves operatively connected to said primary and secondary hydraulic systems, respectively, and to said control unit for selecting operation of one of said primary and secondary hydraulic systems, said first and second solenoid operated shut-off valves being configured to operate in a mutually exclusive manner to positively select between operation of said primary and secondary hydraulic systems without the possibility of having both systems pressurized at the same time.

61. The apparatus of claim 60, wherein said control unit comprises thrust levers, and said solenoid operated shut-off valves are implemented through said thrust levers to positively prevent pressure from the primary hydraulic system and secondary hydraulic system being applied to the normal or alternate brake metering systems during take off.

62. In combination with aircraft landing gear, an apparatus for redundant control of hydraulically operated wheel braking for the aircraft landing gear moving between a retracted position and an actuated position, the landing gear having a plurality of wheels and a corresponding plurality of wheel brakes for the plurality of wheels, wherein said plurality of wheel brakes are symmetrically divided into three sets of wheel brakes, and a plurality of brake pedals for controlling operation of braking of said plurality of said wheels, said apparatus comprising:

a primary hydraulic system connected in fluid communication with said plurality of wheel-brakes for providing hydraulic power for normal operation of said plurality of wheel brakes in a normal braking mode, said primary hydraulic system including a plurality of primary hydraulic fluid control channels and a corresponding plurality of secondary hydraulic fluid control channels, said plurality of secondary hydraulic fluid control channels operating simultaneously and independently from said plurality of primary hydraulic fluid control channels, and wherein said primary hydraulic system comprises first, second and third redundant pairs of primary and secondary fluid control channels, said first redundant pair of primary and secondary fluid control channels including a first primary hydraulic fluid control channel and a first secondary hydraulic fluid control channel, each of said first primary and said first secondary hydraulic fluid control channels controlling said first set of wheel brakes, said second redundant pair of primary and secondary fluid control channels including a second primary hydraulic fluid control channel and a second secondary hydraulic fluid control channel, each of said second primary and said second secondary hydraulic fluid control channels controlling said second set of wheel brakes, said third redundant pair of primary and secondary fluid control channels including a third primary hydraulic fluid control channel and a third secondary hydraulic fluid control channel, each of said third primary and said third secondary hydraulic fluid control channels controlling said third set of wheel brakes;

a secondary hydraulic system connected in fluid communication with said plurality of wheel brakes for providing hydraulic power for operation of said plurality of wheel brakes in an alternate braking mode;

a control unit for controlling brake pressure communicated to said wheel brakes through said primary and secondary hydraulic systems;

a monitor channel operatively connected to said primary hydraulic system for detecting faults in said primary and secondary hydraulic systems and for selecting between the primary and secondary hydraulic systems for providing braking pressure;

first and second solenoid operated shut-off valves operatively connected to said primary and secondary hydraulic systems, respectively, and to said control unit for selecting operation of one of said primary and secondary hydraulic systems, said first and second solenoid operated shut-off valves being configured to operate in a mutually exclusive manner to positively select between operation of said primary and secondary hydraulic systems without the possibility of having both systems pressurized at the same time;

wherein said control unit comprises thrust levers and corresponding thrust lever switches, and said solenoid operated shut-off valves are implemented through said thrust levers to positively prevent pressure from the primary hydraulic system and secondary hydraulic system being applied to the normal or alternate brake metering systems during take off; and a landing gear lever controlling retraction of the landing gear, and dual redundant switches on the landing gear lever to bypass the thrust lever switches to stop the wheels during climb when the thrust levers are advanced to enable wheel braking upon retraction of the landing gear.

63. The apparatus of claim 62, wherein each of the primary brake hydraulic fluid control channels receives a software independent signal that initiates retraction braking for three seconds or until the nose landing gear is up and locked, whichever happens sooner.

64. The apparatus of claim 62, wherein an anti-skid function of the normal braking mode is inhibited during retraction braking.

65. In combination with aircraft landing gear, an apparatus for redundant control of hydraulically operated wheel braking for the aircraft landing gear moving between a retracted position and an actuated position, the landing gear having a plurality of wheels and a corresponding plurality of wheel brakes for the plurality of wheels, wherein said plurality of wheel brakes are symmetrically divided into three sets of wheel brakes, and a plurality of brake pedals for controlling operation of braking of said plurality of said wheels, said apparatus comprising:

a primary hydraulic system connected in fluid communication with said plurality of wheel brakes for providing hydraulic power for normal operation of said plurality of wheel brakes in a normal braking mode, said primary hydraulic system including a plurality of primary hydraulic fluid control channels and a corresponding plurality of secondary hydraulic fluid control channels, said plurality of secondary hydraulic fluid control channels operating simultaneously and independently from said plurality of primary hydraulic fluid control channels, and wherein said primary hydraulic system comprises first, second and third redundant pairs of primary and secondary fluid control channels, said first redundant pair of primary and secondary fluid control channels including a first primary hydraulic fluid control channel and a first secondary hydraulic fluid control channel, each of said first primary and said first secondary hydraulic fluid control channels controlling said first set of wheel brakes, said second redundant pair of primary and secondary fluid control channels including a second primary hydraulic fluid control channel and a second secondary hydraulic fluid control channel, each of said second primary and said second secondary hydraulic fluid control channels controlling said second set of wheel brakes, said third redundant pair of primary and secondary fluid control channels including a third primary hydraulic fluid control channel and a third secondary hydraulic fluid control channel, each of said third primary and said third secondary hydraulic fluid control channels controlling said third set of wheel brakes;

a secondary hydraulic system connected in fluid communication with said plurality of wheel brakes for providing hydraulic power for operation of said plurality of wheel brakes in an alternate braking mode;

a control unit for controlling brake pressure communicated to said wheel brakes through said primary and secondary hydraulic systems;

a monitor channel operatively connected to said primary hydraulic system for detecting faults in said primary and secondary hydraulic systems and for selecting between the primary and secondary hydraulic systems for providing braking pressure;

first and second solenoid operated shut-off valves operatively connected to said primary and secondary hydraulic systems, respectively, and to said control unit for selecting operation of one of said primary and secondary hydraulic systems, said first and second solenoid operated shut-off valves being configured to operate in a mutually exclusive manner to positively select between operation of said primary and secondary hydraulic systems without the possibility of having both systems pressurized at the same time;

wherein said control unit comprises thrust levers and corresponding thrust lever switches, and said solenoid operated shut-off valves are implemented through said thrust levers to positively prevent pressure from the primary hydraulic system and secondary hydraulic system being applied to the normal or alternate brake metering systems during take off; and wherein said control unit comprises a plurality of servo control valves controlled by corresponding dual solenoid coils for controlling the operation of said wheel brakes, respectively, and wherein said thrust levers comprise dual thrust lever switches that break both power and ground to said first and second solenoid operated shut-off valves for the primary hydraulic system and secondary hydraulic system when a thrust lever is advanced.

66. The apparatus of claim 61, wherein said control unit further comprises a plurality of sensors for sensing the position of each brake pedal.

67. In combination with aircraft landing gear, an apparatus for redundant control of hydraulically operated wheel braking for the aircraft landing gear moving between a retracted position and an actuated position, the landing gear having a plurality of wheels and a corresponding plurality of wheel brakes for the plurality of wheels, wherein said plurality of wheel brakes are symmetrically divided into three sets of wheel brakes, and a plurality of brake pedals for controlling operation of braking of said plurality of said wheels, said apparatus comprising:

a primary hydraulic system connected in fluid communication with said plurality of wheel brakes for providing hydraulic power for normal operation of said plurality of wheel brakes in a normal braking mode, said primary hydraulic system including a plurality of primary hydraulic fluid control channels and a corresponding plurality of secondary hydraulic fluid control channels, said plurality of secondary hydraulic fluid control channels operating simultaneously and independently from said plurality of primary hydraulic fluid control channels, and wherein said primary hydraulic system comprises first, second and third redundant pairs of primary and secondary fluid control channels, said first redundant pair of primary and secondary fluid control channels including a first primary hydraulic fluid control channel and a first secondary hydraulic fluid control channel, each of said first primary and said first secondary hydraulic fluid control channels controlling said first set of wheel brakes, said second redundant pair of primary and secondary fluid control channels including a second primary hydraulic fluid control channel and a second secondary hydraulic fluid control channel, each of said second primary and said second secondary hydraulic fluid control channels controlling said second set of wheel brakes, said third redundant pair of primary and secondary fluid control channels including a third primary hydraulic fluid control channel and a third secondary hydraulic fluid control channel, each of said third primary and said third secondary hydraulic fluid control channels controlling said third set of wheel brakes;

a secondary hydraulic system connected in fluid communication with said plurality of wheel brakes for providing hydraulic power for operation of said plurality of wheel brakes in an alternate braking mode;

a control unit for controlling brake pressure communicated to said wheel brakes through said primary and secondary hydraulic systems;

a monitor channel operatively connected to said primary hydraulic system for detecting faults in said primary and secondary hydraulic systems and for selecting between the primary and secondary hydraulic systems for providing braking pressure;

first and second solenoid operated shut-off valves operatively connected to said primary and secondary hydraulic systems, respectively, and to said control unit for selecting operation of one of said primary and secondary hydraulic systems, said first and second solenoid operated shut-off valves being configured to operate in a mutually exclusive manner to positively select between operation of said primary and secondary hydraulic systems without the possibility of having both systems pressurized at the same time;

wherein said control unit comprises thrust levers and corresponding thrust lever switches, and said solenoid operated shut-off valves are implemented through said thrust levers to positively prevent pressure from the primary hydraulic system and secondary hydraulic system being applied to the normal or alternate brake metering systems during take off;

wherein said control unit further comprises a plurality of sensors for sensing the position of each brake pedal, and wherein said sensors comprise dual redundant switches that break both power and ground to said first and second solenoid operated shut-off valves, such that depression of either brake pedal opens the first and second solenoid operated shut-off valve for the active hydraulic system.

68. In combination with aircraft landing gear, an apparatus for redundant control of hydraulically operated wheel braking for the aircraft landing gear moving between a retracted position and an actuated position, the landing gear having a plurality of wheels and a corresponding plurality of wheel brakes for the plurality of wheels, wherein said plurality of wheel brakes are symmetrically divided into three sets of wheel brakes, and a plurality of brake pedals for controlling operation of braking of said plurality of said wheels, said apparatus comprising:

a primary hydraulic system connected in fluid communication with said plurality of wheel brakes for providing hydraulic power for normal operation of said plurality of wheel brakes in a normal braking mode, said primary hydraulic system including a plurality of primary hydraulic fluid control channels and a corresponding plurality of secondary hydraulic fluid control channels, said plurality of secondary hydraulic fluid control channels operating simultaneously and independently from said plurality of primary hydraulic fluid control channels, and wherein said primary hydraulic system comprises first, second and third redundant pairs of primary and secondary fluid control channels, said first redundant pair of primary and secondary fluid control channels including a first primary hydraulic fluid control channel and a first secondary hydraulic fluid control channel, each of said first primary and said first secondary hydraulic fluid control channels controlling said first set of wheel brakes, said second redundant pair of primary and secondary fluid control channels including a second primary hydraulic fluid control channel and a second secondary hydraulic fluid control channel, each of said second primary and said second secondary hydraulic fluid control channels controlling said second set of wheel brakes, said third redundant pair of primary and secondary fluid control channels including a third primary hydraulic fluid control channel and a third secondary hydraulic fluid control channel, each of said third primary and said third secondary hydraulic fluid control channels controlling said third set of wheel brakes;

a secondary hydraulic system connected in fluid communication with said plurality of wheel brakes for providing hydraulic power for operation of said plurality of wheel brakes in an alternate braking mode;

a control unit for controlling brake pressure communicated to said wheel brakes through said primary and secondary hydraulic systems;

a monitor channel operatively connected to said primary hydraulic system for detecting faults in said primary and secondary hydraulic systems and for selecting between the primary and secondary hydraulic systems for providing braking pressure;

first and second solenoid operated shut-off valves operatively connected to said primary and secondary hydraulic systems, respectively, and to said control unit for a selecting operation of one of said primary and secondary hydraulic systems, said first and second solenoid operated shut-off valves being configured to operate in a mutually exclusive manner to positively select between operation of said primary and secondary hydraulic systems without the possibility of having both systems pressurized at the same time;

wherein said control unit comprises thrust levers and corresponding thrust lever switches, and said solenoid operated shut-off valves are implemented through said thrust levers to positively prevent pressure from the primary hydraulic system and secondary hydraulic system being applied to the normal or alternate brake metering systems during take off; and wherein said first and second solenoid operated shut-off valves also turn off hydraulic power to said servo control valves during flight.

69. The apparatus of claim 61, wherein said first and second solenoid operated shut-off valves comprise three way solenoid operated shut-off valves.

70. The apparatus of claim 61, wherein said control unit further comprises sensor means for determining brake pedal application and for generating a pedal application signal indicating actuation of the wheel braking system when said brake pedal has been applied.

71. In combination with aircraft landing gear, an apparatus for redundant control of hydraulically operated wheel braking for the aircraft landing gear moving between a retracted position and an actuated position, the landing gear having a plurality of wheels and a corresponding plurality of wheel brakes for the plurality of wheels, wherein said plurality of wheel brakes are symmetrically divided into three sets of wheel brakes, and a plurality of brake pedals for controlling operation of braking of said plurality of said wheels, said apparatus comprising:

a primary hydraulic system connected in fluid communication with said plurality of wheel brakes for providing hydraulic power for normal operation of said plurality of wheel brakes in a normal braking mode, said primary hydraulic system including a plurality of primary hydraulic fluid control channels and a corresponding plurality of secondary hydraulic fluid control channels, said plurality of secondary hydraulic fluid control channels operating simultaneously and independently from said plurality of primary hydraulic fluid control channels, and wherein said primary hydraulic system comprises first, second and third redundant pairs of primary and secondary fluid control channels, said first redundant pair of primary and secondary fluid control channels including a first primary hydraulic fluid control channel and a first secondary hydraulic fluid control channel, each of said first primary and said first secondary hydraulic fluid control channels controlling said first set of wheel brakes, said second redundant pair of primary and secondary fluid control channels including a second primary hydraulic fluid control channel and a second secondary hydraulic fluid control channel, each of said second primary and said second secondary hydraulic fluid control channels controlling said second set of wheel brakes, said third redundant pair of primary and secondary fluid control channels including a third primary hydraulic fluid control channel and a third secondary hydraulic fluid control channel, each of said third primary and said third secondary hydraulic fluid control channels controlling said third set of wheel brakes;

a secondary hydraulic system connected in fluid communication with said plurality of wheel brakes for providing hydraulic power for operation of said plurality of wheel brakes in an alternate braking mode;

a control unit for controlling brake pressure communicated to said wheel brakes through said primary and secondary hydraulic systems;

a monitor channel operatively connected to said primary hydraulic system for detecting faults in said primary and secondary hydraulic systems and for selecting between the primary and secondary hydraulic systems for providing braking pressure;

first and second solenoid operated shut-off valves operatively connected to said primary and secondary hydraulic systems, respectively, and to said control unit for selecting operation of one of said primary and secondary hydraulic systems, said first and second solenoid operated shut-off valves being configured to operate in a mutually exclusive manner to positively select between operation of said primary and secondary hydraulic systems without the possibility of having both systems pressurized at the same time;

wherein said control unit comprises thrust levers and corresponding thrust lever switches, and said solenoid operated shut-off valves are implemented through said thrust levers to positively prevent pressure from the primary hydraulic system and secondary hydraulic system being applied to the normal or alternate brake metering systems during take off; and wherein said control unit further comprises means for sensing weight on said wheel and for generating a brake inhibit signal when weight is not applied on said wheel.

72. The apparatus of claim 47, wherein said control unit further comprises a plurality of servo control valves for controlling the operation of said wheel brakes, and wherein said plurality of servo control valves are controlled by corresponding dual solenoid coils.

73. The apparatus of claim 72, wherein said plurality of servo control valves are further controlled with pressure feedback.

74. The apparatus of claim 72, wherein said plurality of servo control valves comprises twelve dual coil brake control valves in the primary hydraulic fluid system.

75. The apparatus of claim 73, further comprising antiskid control provided on each wheel brake utilizing the dual coil servo control valves with pressure feedback.

76. In combination with aircraft landing gear, an apparatus for redundant control of hydraulically operated wheel braking for the aircraft landing gear moving between a retracted position and an actuated position, the landing gear having a plurality of wheels and a corresponding plurality of wheel brakes for the plurality of wheels, wherein said plurality of wheel brakes are symmetrically divided into three sets of wheel brakes, and a plurality of brake pedals for controlling operation of braking of said plurality of said wheels, said apparatus comprising:

a primary hydraulic system connected in fluid communication with said plurality of wheel brakes for providing hydraulic power for normal operation of said plurality of wheel brakes in a normal braking mode, said primary hydraulic system including a plurality of primary hydraulic fluid control channels and a corresponding plurality of secondary hydraulic fluid control channels, said plurality of secondary hydraulic fluid control channels operating simultaneously and independently from said plurality of primary hydraulic fluid control channels, and wherein said primary hydraulic system comprises first, second and third redundant pairs of primary and secondary fluid control channels, said first redundant pair of primary and secondary fluid control channels including a first primary hydraulic fluid control channel and a first secondary hydraulic fluid control channel, each of said first primary and said first secondary hydraulic fluid control channels controlling said first set of wheel brakes, said second redundant pair of primary and secondary fluid control channels including a second primary hydraulic fluid control channel and a second secondary hydraulic fluid control channel, each of said second primary and said second secondary hydraulic fluid control channels controlling said second set of wheel brakes, said third redundant pair of primary and secondary fluid control channels including a third primary hydraulic fluid control channel and a third secondary hydraulic fluid control channel, each of said third primary and said third secondary hydraulic fluid control channels controlling said third set of wheel brakes;

a secondary hydraulic system connected in fluid communication with said plurality of wheel brakes for providing hydraulic power for operation of said plurality of wheel brakes in an alternate braking mode;

a control unit for controlling brake pressure communicated to said wheel brakes through said primary and secondary hydraulic systems;

a monitor channel operatively connected to said primary hydraulic system for detecting faults in said primary and secondary hydraulic systems and for selecting between the primary and secondary hydraulic systems for providing braking pressure; and wherein said control unit comprises system six brake control cards providing dual redundant digital brake-by-wire controls.

77. The apparatus of claim 47, wherein said control unit comprises a built-in-test equipment card for said primary hydraulic fluid system providing mutually exclusive hydraulic system selection.

78. The apparatus of claim 72, wherein said control unit comprises a pressure sensor mounted downstream of each servo control valve for detecting asymmetrical braking due to unwanted pressure applied to any wheel brake, whereby the monitor channel can select the alternate hydraulic fluid system.

79. The apparatus of claim 47, further comprising an autobrake control subsystem.

80. The apparatus of claim 50, wherein said primary and secondary hydraulic fluid control channels are connected to said front and aft pairs of wheel brakes such that the left brake pedals control the front axle pair and the right brake pedals control the aft axle pair.

81. The apparatus of claim 56, wherein said emergency braking system provides braking to center landing gear and main landing gear wheel brakes.

* * * * *

UNITED STATES PATENT AND TRADEMARK OFFICE
CERTIFICATE OF CORRECTION

PATENT NO. : 6,513,885 B1  Page 1 of 2
DATED : February 4, 2003
INVENTOR(S) : Bijan Salamat et al.

It is certified that error appears in the above-identified patent and that said Letters Patent is hereby corrected as shown below:

Title page,
Item [56], U.S. PATENT DOCUMENTS, add the following:

```
--3,682,512    8/1972    Malon et al.
  3,702,714   11/1972    Branson
  3,829,167    8/1974    Rouf et al.
  4,043,607    8/1977    Signorelli et al.
  4,105,258    8/1978    Bornfleth
  4,768,840    9/1988    Sullivan et al.
  5,312,168    5/1994    Breen
  3,578,819    5/1971    Atkins
  3,604,760    9/1971    Atkins
  3,711,163    1/1973    Booher
  Re.30,763   10/1981    Hirzel et al.
  Re.33,486   12/1990    Hirzel et al.
  3,547,714    4/1971    Howard et al.
  3,614,174   10/1971    Romero
  3,587,798    6/1971    Schuman
  5,204,619    4/1993    Beigbeder et al.
  5,051,578    9/1991    Slemon et al.
  5,507,568    4/1996    Cook et al.
  5,390,990    2/1995    Cook et al.
  5,394,137    2/1995    Orschek
  5,003,818    4/1991    Hoodenpyle et al.
  5,378,052    1/1995    Yoshino
  4,771,387    9/1988    Hexel et al.
  4,824,182    4/1989    Steffes et al.
  5,535,622    8/1996    Walter
  2,409,467   10/1946    Bock
  3,602,042    8/1971    Mitchell
  5,605,387    2/1997    Cook et al.
  4,033,630    7/1977    Hubbard
  4,313,616    2/1982    Howard
  3,955,652    5/1976    Nilsson et al.
  5,962,777   10/1999    Salamat et al.
  5,777,218    7/1998    Salamat et al.--.
```

FOREIGN PATENT DOCUMENTS, add the following:

```
--DE   42 43 245 A1    6/1994
  EP   0 231 829 A3    8/1987
  EP   0 387 810 A1    7/1990
  EP   0 386 939 A1    9/1990
  EP   0 426 959 A3    5/1991
  EP   0 445 575 A3    9/1991
  EP   0 575 936 A1   12/1993
  FR   2 637 231       4/1990--.
```

UNITED STATES PATENT AND TRADEMARK OFFICE
CERTIFICATE OF CORRECTION

PATENT NO.   : 6,513,885 B1
DATED        : February 4, 2003
INVENTOR(S)  : Bijan Salamat et al.

It is certified that error appears in the above-identified patent and that said Letters Patent is hereby corrected as shown below:

<u>Title page cont'd,</u>
Item [56], after last entry of FOREIGN PATENT DOCUMENTS, add -- OTHER PUBLICATIONS --, and the following:

```
--Motohiro Igarashi, et al., Digital Brake Control System
  for Mag-Lev Trains, Presented at S'Tech '93 (The Inter-
  national Conference on Speedup Technoilogy for Railway
  and MagLev Vehicles), Nov. 1993, Yokohama, Japan.--.
```

<u>Column 33,</u>
Line 30, after "claim", add -- 47 --.

Signed and Sealed this

Eighth Day of July, 2003

JAMES E. ROGAN
*Director of the United States Patent and Trademark Office*